(12) United States Patent
Kim et al.

(10) Patent No.: US 12,242,459 B2
(45) Date of Patent: Mar. 4, 2025

(54) FINE-GRAINED DECISION ON PROPAGATION OF REVALIDATION

(71) Applicant: SAP SE, Walldorf (DE)

(72) Inventors: Jaehwa Kim, Seoul (KR); Kyungyul Park, Seoul (KR); Eunsang Kim, Seoul (KR); Joo Yeon Lee, Seoul (KR); Taehyung Lee, Seoul (KR)

(73) Assignee: SAP SE, Walldorf (DE)

( * ) Notice: Subject to any disclaimer, the term of this patent is extended or adjusted under 35 U.S.C. 154(b) by 85 days.

(21) Appl. No.: 17/973,440

(22) Filed: Oct. 25, 2022

(65) Prior Publication Data

US 2024/0134842 A1 Apr. 25, 2024
US 2024/0232165 A9 Jul. 11, 2024

(51) Int. Cl.
G06F 16/23 (2019.01)
G06F 11/34 (2006.01)
G06F 16/21 (2019.01)

(52) U.S. Cl.
CPC ...... *G06F 16/2365* (2019.01); *G06F 11/3409* (2013.01); *G06F 16/213* (2019.01)

(58) Field of Classification Search
CPC ............. G06F 16/2365; G06F 11/3409; G06F 16/213; G06F 16/21; G06F 16/23; G06F 16/2433; G06F 16/2443; G06F 16/2445
See application file for complete search history.

(56) References Cited

U.S. PATENT DOCUMENTS

| | | | |
|---|---|---|---|
| 6,374,263 B1 | 4/2002 | Bunger et al. | |
| 9,231,715 B2 | 1/2016 | Kim et al. | |
| 11,055,275 B2 | 7/2021 | Kim | |
| 11,347,730 B1* | 5/2022 | Balakrishnan | G06F 16/2445 |
| 2014/0241356 A1 | 8/2014 | Zhang et al. | |
| 2017/0060989 A1 | 3/2017 | Shinkuma et al. | |
| 2020/0192914 A1 | 6/2020 | Heinle et al. | |
| 2020/0225935 A1 | 7/2020 | Avgustinov | |
| 2021/0247192 A1* | 8/2021 | Matsumoto | G01S 7/4802 |
| 2021/0279354 A1* | 9/2021 | Gandhi | G06F 11/3034 |

(Continued)

OTHER PUBLICATIONS

Hsia, A Technique for the Selective Revalidation of OO Software, Software Maintenance: Research and Practice, vol. 9, pp. 217-233. (Year: 1997).*

(Continued)

*Primary Examiner* — Albert M Phillips, III
(74) *Attorney, Agent, or Firm* — Klarquist Sparkman, LLP

(57) ABSTRACT

Various systems and methods for selective revalidation of data objects are provided. In one example, a computer-implemented method includes updating a target data object of a database system according to a definition statement, and determining whether the definition statement changes one or more object properties of the target data object. In response to determining that the definition statement changes the one or more object properties of the target data object, the method includes revalidating data objects depending on the target data object. In response to determining that the definition statement does not change the one or more object properties of the target data object, the method includes not revalidating the data objects depending on the target data object. In this way, database management performance and speed may be improved while maintaining validity of data objects in a database.

20 Claims, 14 Drawing Sheets

(56) References Cited

U.S. PATENT DOCUMENTS

2023/0025015 A1* 1/2023 Lechev .................. G06F 8/35
2023/0385276 A1 11/2023 Bok et al.

OTHER PUBLICATIONS

Extended European Search Report received in European Patent Application No. 23204059.2-1203, dated Mar. 21, 2024, 9 pages.
Jayashree et al., "Chapter 26—Understanding Schema Object Dependency," Jul. 2021, XP093140707, Retrieved from the Internet: https://docs.oracle.com/en/database/oracle/oracle-database/18/adfns/database-development-guide.pdf, retrieved on Mar. 13, 2024, 21 pages.

* cited by examiner

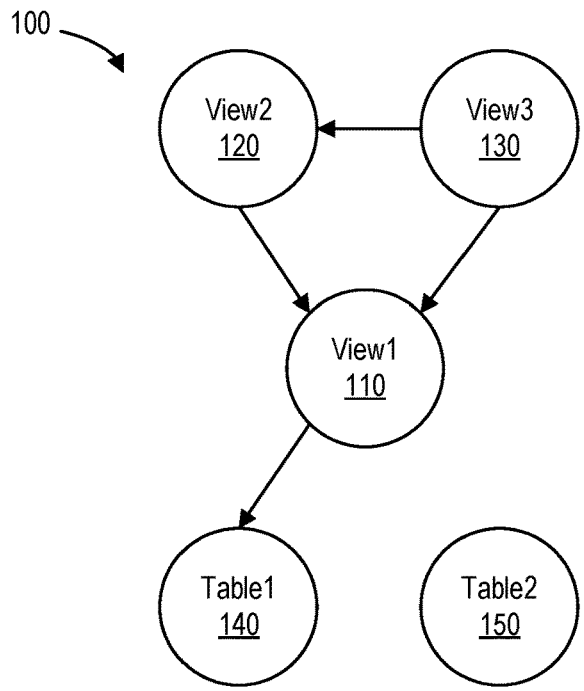
FIG. 1A
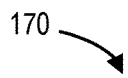
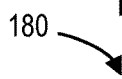
FIG. 1B

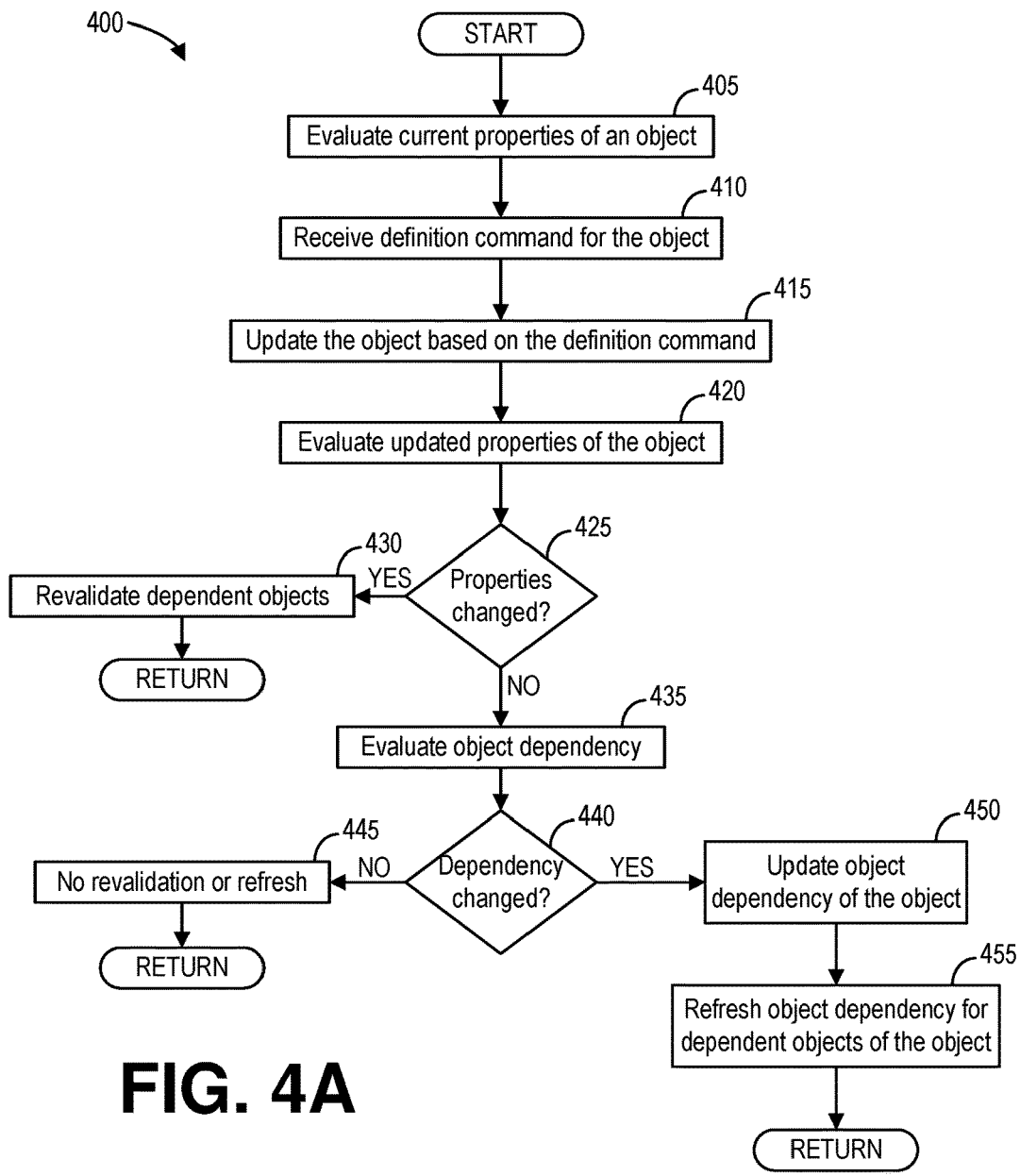

FINE-GRAINED DECISION ON PROPAGATION OF REVALIDATION

FIELD

The present disclosure generally relates to database management systems, and applications or systems that perform metadata object processing and filtering. Particular implementations relate to database object revalidation.

BACKGROUND

Large databases storing massive amounts of data are increasingly common. Such databases may use varying structures for storing the data, which may use metadata to assist in defining the structures. When such structures or metadata are created or altered, the remainder of the structure may need to be checked or reviewed. However, for massive databases such checking may take a significant amount of time. Thus, there is room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Database revalidation may be performed or skipped depending on whether a change to a data object causes a change in object properties. In one example, a method includes receiving a definition statement or command relating to a data object in a database system. The data object of a database system is updated according to a definition statement. Data objects depending on the data object are revalidated if object properties of the data object changed while updating the target data object. Data objects depending on the data object are not revalidated if the object properties of the data object do not change while updating the data object. In this way, revalidation can be selectively propagated, thereby improving database management by reducing the amount of processing after updating a data object.

The present disclosure also includes computing systems and tangible, non-transitory computer-readable storage media configured to carry out, or including instructions for carrying out, an above-described method. As described herein, a variety of other features and advantages can be incorporated into the technologies as desired.

The foregoing and other objects, features, and advantages of the invention will become more apparent from the following detailed description, which proceeds with reference to the accompanying figures.

BRIEF DESCRIPTION OF THE DRAWINGS

FIG. 1A is a diagram illustrating an example set of data objects, according to one example.

FIG. 1B is a set of tables illustrating example object dependency and object view metadata for the example set of data objects of FIG. 1A.

FIG. 4A is a high-level flow chart illustrating an example method for selective revalidation of database objects.

FIG. 4B shows example pseudocode for object definition operations with selective revalidation of database objects.

DETAILED DESCRIPTION

Figure 2A:
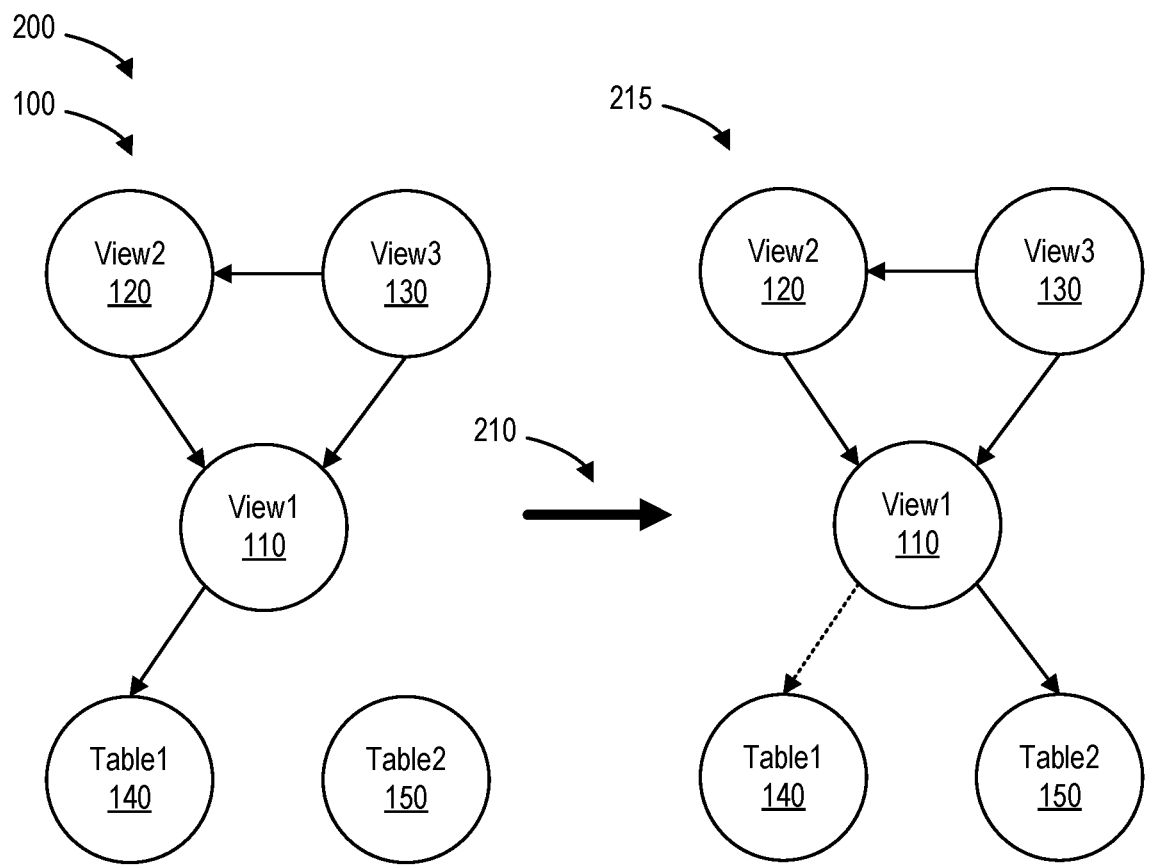
FIG. 2A is a diagram illustrating an example object definition operation applied to the set of data objects of FIG. 1A.

A variety of examples are provided herein to illustrate the disclosed technologies. The technologies from any example can be combined with the technologies described in any one or more of the other examples to achieve the scope and spirit of the disclosed technologies as embodied in the claims, beyond the explicit descriptions provided herein. Further, the components described within the examples herein may be combined or recombined as well, as understood by one skilled in the art, to achieve the scope and spirit of the claims.

Example 1—Overview of Fine-Grained Decision on Propagation of Revalidation

A database generally has many data objects, such as tables or views, which are often interrelated. For example, a view may be formed from multiple tables, or a first table may have foreign key dependencies on multiple tables. Massive databases may have hundreds of thousands of data objects which may have interdependencies. Because of these interdependencies, as one data object is changed, other data objects may become invalid or require changes as well. Thus, revalidation (or confirmation of validity) may be necessary when a change is made to a data object.

To illustrate a simple scenario of data object revalidation in a database, FIG. 1A depicts a set 100 of data objects, at least some of which are interrelated. The set 100 of data objects includes a first data object View1 110, a second data object View2 120, a third data object View3 130, a fourth data object Table1 140, and a fifth data object Table2 150.

A database may thus have these data objects expressed as the following data objects (which are generally valid at their time of creation):
  CREATE TABLE Table1 (A INT NOT NULL, B VARCHAR(100) DEFAULT 'TEST1');
  CREATE TABLE Table2 (A INT NOT NULL DEFAULT 10, B VARCHAR(200) DEFAULT 'TEST2');
  CREATE VIEW View1 AS SELECT * FROM Table1;
  CREATE VIEW View2 AS SELECT * FROM View1;
  CREATE VIEW View3 AS SELECT View1.A, View2.B FROM View1, View2;

Notably, the data object Table2 150 does not have any data objects depending therefrom in the depicted example. FIG. 1B shows object dependency table 170 illustrating object dependencies of the set 100 as well as view metadata table 180 illustrating view metadata for the views of the set 100. The metadata for these data objects may be as follows, which details the data objects interdependencies:
  objects: Table1, Table2, View1, View2, View3
  dependency: (View1 references Table1), (View2 references View1), (View3 references View1), (View3 references View2)

The dependency type depicted in the object dependency table 170 indicates that, as depicted in FIG. 1A, View1 110 has a direct dependency to the base object Table1 140, View2 120 has an indirect dependency to the base object Table1 140, View3 130 has an indirect dependency to the base object Table1 140, View2 120 has a direct dependency to the base object View1 110, View3 130 has a direct dependency to the base object View1 110, View3 130 has a direct dependency to the base object View2 120, and there is no object dependency to the base object Table2 150.

The view metadata table 180 depicts how the logical structure of Table1 140 is propagated into the views depending directly or indirectly therefrom, namely View1 110, View2 120, and View3 130. For example, for the view View1 110, the view columns include the data from the columns of the data object Table1 140, namely a first column with "A INT NOT NULL" and a second column with "B VARCHAR(100) DEFAULT 'TEST1'" as depicted. Similarly, according to the dependency of the view View2 120 to the view View1 110, the view columns of the view View2 120 also include a first column with "A INT NOT NULL" and a second column with "B VARCHAR(100) DEFAULT 'TEST1'" as depicted. As the view View3 130 selects the first column of View1 110 and the second column of View2 120, the view columns of the view View3 130 also include a first column with "A INT NOT NULL" and a second column with "B VARCHAR(100) DEFAULT 'TEST1'" as depicted.

Next, a change may be made to a data object, such as altering the dependency of a view from one data object to another data object:
  ALTER VIEW View1 AS SELECT * FROM Table2;

FIG. 2A shows a diagram 200 illustrating the application of such change 210 to a data object of the set 100 of data objects results in a different set 215 of data objects. As depicted, the change 210 alters the view View1 110 in a way that changes the dependency of View1 110 from the data object Table1 140 to the data object Table2 150. The columns of the data object Table2 150 are different from the data object Table1 140:
  CREATE TABLE Table1 (A INT NOT NULL, B VARCHAR(100) DEFAULT 'TEST1');
  CREATE TABLE Table2 (A INT NOT NULL DEFAULT 10, B VARCHAR(200) DEFAULT 'TEST2');

As a result of the ALTER operation 210, the metadata for these data objects and the data objects interdependencies change as follows:
  objects: Table1, Table2, View1, View2, View3
  dependency: (View1 references Table2), (View2 references View1), (View3 references View1), (View3 references View2)

Figures 2B, 2C:
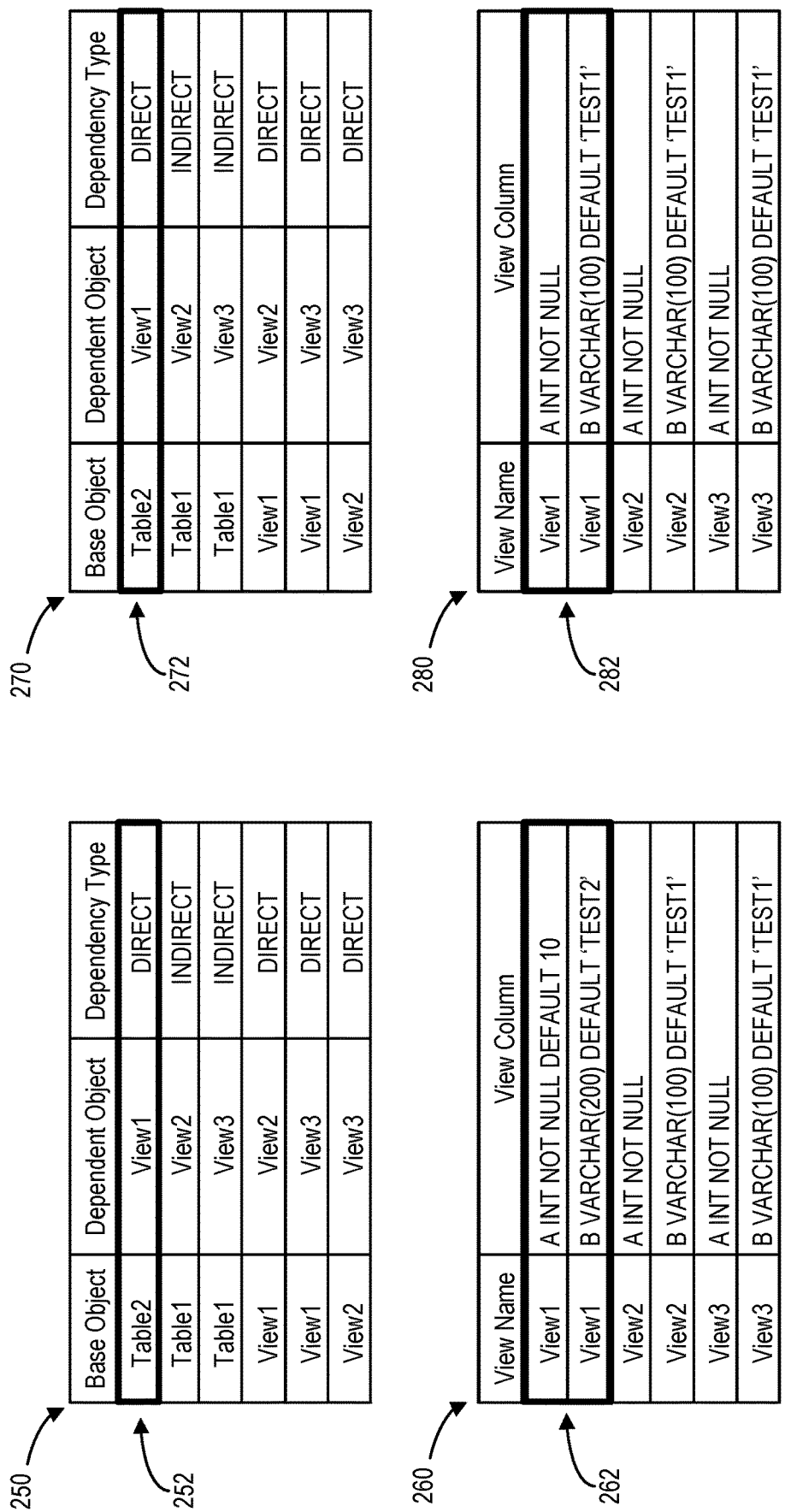
FIG. 2B is a set of tables illustrating example object dependency and object view metadata after a first example object definition operation.
FIG. 2C is a set of tables illustrating example object dependency and object view metadata after a second example object definition operation.

FIG. 2B shows object dependency table 250 illustrating an initial change to the object dependencies of the set 215 as well as view metadata table 260 illustrating an initial change to the view metadata for the views of the set 215. After the change or ALTER operation 210 is made, where the dependency of View1 110 changes from Table1 140 to Table2 150, the entry 252 of the object dependency table 250 for the data object View1 110 changes from direct dependency on the data object Table1 140 to the data object Table2 150 as a base object. Similarly, as depicted in the view metadata table 260, the view metadata 262 for the data object View1 110 changes to correspond to the columns of the data object Table2 150. As a result, the dependent objects View2 120 and View3 130 may next be revalidated because they are now indirectly dependent on the base object Table2 150 instead of the base object Table1 140. The object dependencies and view metadata may be updated and the data objects revalidated based on a dependency tree generated by topological order from the data object View1 110. For example, the data object View2 120 may be checked, updated, and revalidated, and then the data object View3 130 may be checked, updated, and revalidated. Revalidating the dependent objects in this way ensures that data objects which may be invalidated due to a definition operation (e.g., by altering a base object, dropping a base object, and/or changing dependency) are correctly flagged as invalid, such that an error message (e.g., "view is invalid") may be provided based on the validation flag rather than attempting to execute a command on the invalid data object. In other cases, effects of a change can be previewed, and a user alerted of objects that might be invalidated by the change. A user can use this information, for example, to decide not to make the change, to make a different change, to update other objects so they are valid after the change, or to remove objects so that other users will not encounter errors.

A data object (e.g., View2) may become invalid, for example, if another data object on which the data object depends (e.g., View1 and/or Table1) is changed in a way that would affect the validity of the data object. For example, if a column is deleted from a base object (e.g., Table1) on which the data object (e.g., View2) at least indirectly depends, accessing the data object (e.g., View2) may fail because the base object referred to by the data object no longer exists. In such examples, the invalid data object is flagged as invalid. In contrast, a data object may still be valid despite a change to a base object if the object properties of the base object did not change. In some examples, a data object may still be valid despite a change to a base object if at least the logical structure of the base object is maintained. For example, suppose the view View2 directly depends on a view View1 which in turn depends on a table Table1, as discussed above. If the view View1 is altered as discussed above to depend on a table Table2 with a same logical structure (e.g., the same attributes), then the view View2 may still be valid because the logical structure of the direct base object View1 did not change despite the change in indirect base objects (e.g., from Table1 to Table2). In some examples, the data object may still be valid if the logical structure is unchanged but the content of the base object is changed.

Information about added or removed attributes of tables or views resulting from a change to a related data object can be provided to a user, for example, and a user can confirm whether the attributes should be added or removed from the related data object, or the related data object changed in some other manner to accommodate the change to the related data object. In further cases, at least certain data objects can be automatically updated in response to a change to a data object on which a dependency exists. For example, attributes that are missing or added can be identified, and suitable commands (such as DDL statements) generated to alter the data object.

In the above example, the views View2 120 and View3 130 are still valid once the object dependencies and the view metadata for the views View2 120 and View3 130 are updated. However, object revalidation is slow if there are many dependent objects, such as in massive databases. For example, in implementations where a root data object has 200,000 dependent data objects, revalidation may take approximately 20 minutes to complete.

As described further herein, the computational expense (e.g., processing resources dedicated to revalidation and amount of time spent revalidating data objects) may be significantly reduced if the object properties are unchanged after a change is applied. Specifically, a method for selectively revalidating or selectively propagating revalidation through a set of interrelated data objects may include skipping revalidation if object properties are not changed. For example, consider the above example where the data objects Table1 140 and Table2 150 are instead:

CREATE TABLE Table1 (A INT NOT NULL, B VAR-CHAR(100) DEFAULT 'TEST1');
CREATE TABLE Table2 (A INT NOT NULL, B VAR-CHAR(100) DEFAULT 'TEST1');

When applying the ALTER operation 210 described above to change the dependency of the view View1 110 from Table1 140 to Table2 150, the object properties of View1 110 are unchanged because the data objects Table1 140 and Table2 150 are identical in this example. FIG. 2C shows object dependency table 270 illustrating this initial change to the object dependencies of the set 215 as well as view metadata table 280 illustrating an initial change to the view metadata for the views of the set 215. The entry 272 of the object dependency table 270 indicates that the base object of the data object View1 110 is now the data object Table2 150, while the view metadata 282 for View1 110 is updated based on the columns of Table2 150.

Since the attributes of View1 110 are unchanged as reflected between the view metadata tables 180 and 280, revalidating the dependent data objects would not result in any changes to the view columns of the dependent views, and so propagating revalidation actions through the set of data objects, for example by iterating through dependent objects to update view metadata and revalidate dependent objects, is unnecessary. Instead, only updating the object dependency of the dependent objects is necessary, and revalidation can be skipped. For example, a method for selective revalidation may include, responsive to determining that the view metadata for the altered data object (i.e., View1 110) did not change after the alter operation, updating remaining entries of the object dependency table 270 (e.g., so that the indirect dependency of dependent objects View2 and View3 are changed to base object Table2), not updating remaining entries of the view metadata table 280, and not checking the validity of any data objects. By selectively propagating revalidation in this way, where revalidation is not performed when object properties are unchanged, revalidation performance may be significantly improved due to the reduction in computational expense of revalidation.

Example 2—Environment for Selective Revalidation of Data Objects

Figure 3:
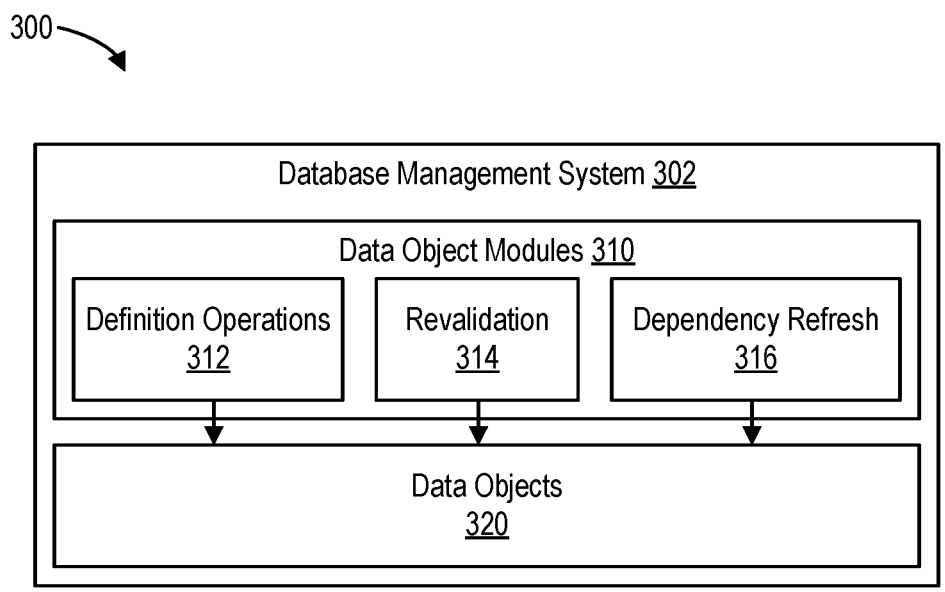
FIG. 3 is a block diagram illustrating an example architecture for a database management system in which described embodiments can be implemented.

FIG. 3 shows a block diagram illustrating an example architecture 300 for selective revalidation of data objects in a database. The architecture 300 may be implemented in one or more computing systems as described further herein. A database management system 302 may comprise a plurality of data object modules 310 and a plurality of data objects 320. The data objects 320 are generally interrelated, with some objects depending from other objects. The data objects 320 may comprise tables, views, procedures, synonyms, sequences, triggers, or other data objects. Generally, such data objects may have metadata that stores information about their respective dependencies. The metadata can be stored in a central structure or set of structures, such as in a data dictionary or information schema. Object dependencies may thus be determined by referencing such a data dictionary, for example by analyzing the data dictionary and extracting object dependency information. Additionally or alternatively, object dependencies and/or view metadata may be stored as data objects such as the tables 170 and 180 described hereinabove.

The data objects 320 may comprise data objects in a database, such as tables or views, or other database objects such as procedures, synonyms, sequences, or triggers. Such objects may comprise metadata objects having metadata regarding the object or the dependencies of the object. Other data objects may include instantiated class objects or any other data objects which may reference or depend from or on each other. Outside a database, the data objects may comprise nodes in a tree or another hierarchy, or interdependent instantiated data variables or objects.

An object, such as the object Table1 140 depicted in FIG. 1A as an illustrative example, may comprise a root object. A root object may comprise an initial object, a top-level object, or an object without dependencies to any other objects in a set of interrelated data objects, such as the set 100. A root object, such as Table1 140, may have dependencies to other objects not part of the set 100 of interrelated data objects. In such cases, the other objects upon which the root object depends are generally not part of or relevant to the processing of the set 100 of interrelated data objects. For example, a revalidation process may include logic specifying particular types of relationships that will be analyzed, and optionally may include certain types of relationships that will not be analyzed.

As mentioned above and described herein, the logical structure of an object can be represented by a definition statement (DEFINITION) of the data object. In certain examples, the definition statement can be written in Data Definition Language (DDL), which is a SQL syntax for creating and/or modifying database objects (e.g., tables). Example DDL commands include CREATE, ALTER, DROP, TRUNCATE, and so on. Note that while some DDL commands (e.g., CREATE) may change the logical structure of an existing table, some DDL commands (e.g., TRUNCATE) may not change the logical structure of an existing table. In other examples, the definition statement of an object can be represented by other formats and syntaxes so long as the logical structure of the object (e.g., attributes, data types, and so on) can be captured. As one illustrative example, the logical structures of data objects are expressed as DDL statements which are readable strings, such as "CREATE TABLE Table1 (A INT NOT NULL, B VARCHAR(100) DEFAULT 'TEST1')" and "CREATE VIEW View1 AS SELECT * FROM Table1." In these examples, the CREATE statements (in string format) can hold or define the logical structures of the data objects. Alternatively, the logical structures of data objects can be expressed in other formats. For example, the DDL statements can be reversibly converted into binary values, hash values, or the like. In one particular example, each DDL statement can be converted into a 128-bit hash value, which can be stored more efficiently than the Create statement strings. Comparison of the DDL statements based on hash values can also be more efficient (e.g., faster) than comparison of DDL strings. Thus, while DDL statements are described herein with regard to readable strings, it should be appreciated that other expressions of DDL statements may be used without departing from the scope of the present disclosure.

The plurality of data object modules 310 may comprise a definition operations module 312. The definition operations module 312 is configured to generate or otherwise interact with the data objects 320 of the database management system 302 via definition statements. For example, the definition operations module 312 may cause a change in the data objects 320 through CREATE, ALTER, REPLACE, and DROP statements, and the like.

The plurality of data object modules 310 may further comprise a revalidation module 314. The revalidation module 314 is configured to revalidate the data objects 320 responsive to one or more changes in the data objects 320 that may be caused, for example, by one or more definition statements or definition operations performed by the definition operations module 312. As described further herein, the revalidation module 314 may selectively revalidate data objects of the plurality of data objects 320, for example by skipping revalidation of data objects where object properties are unchanged after an action by the definition operations module 312. To revalidate data objects in response to a change to a base object upon which dependent data objects depend, the revalidation module 314 updates the dependent data objects according to the change to the base object and determines whether each dependent data object is still valid after the change. The revalidation module 314 thus may change the validation flag of a given data object to "invalid" if the change to a base object renders the dependent data object invalid, for example by referring to a structure that no longer exists (or will no longer exist after the change is implemented, in examples wherein the revalidation module 314 evaluates the impact of a proposed change to a data object).

The plurality of data object modules 310 may further comprise a dependency refresh module 316. The dependency refresh module 316 is configured to refresh the object dependency of one or more dependent objects of the data objects 320 responsive to a change in the data objects 320. For example, the dependency refresh module 316 may maintain and update entries in an object dependency table, such as the object dependency table 170. The dependency refresh module 316 updates object dependencies whether or not the revalidation module 314 revalidates corresponding data objects, for example by updating view metadata for dependent data objects and checking whether such dependent data objects are still valid after the change. The dependency refresh module 316 thus ensures that object dependencies for a given data object are updated and correct, even if the revalidation module 314 does not evaluate the validity of the given data object after a change in the data objects 320. Example DDL statements where the dependency refresh module 316 may update object dependencies for dependent objects while the revalidation module 314 skips revalidation of the dependent objects may include, but are not limited to, ALTER VIEW, CREATE OR REPLACE VIEW, CREATE OR REPLACE PROCEDURE, and so on.

As one illustrative and non-limiting example, consider the following DDL statements:

CREATE TABLE Table1(A INT NOT NULL, B VARCHAR(100) DEFAULT 'TEST1');
CREATE TABLE Table2(A INT NOT NULL, B VARCHAR(100) DEFAULT 'TEST1');
CREATE VIEW View1 AS SELECT * FROM Table1;
ALTER VIEW View1 AS SELECT * FROM Table2;

In the above example, the first two DDL statements create tables. Specifically, the first CREATE statement creates a table Table1 with a column A and a column B, while the second CREATE statement creates a table Table2 with columns A and B with a same structure and default entries as the table Table1 created by the first CREATE statement. The third DDL statement is a CREATE statement that creates a view View1 which selects and thus includes all columns from the table Table1. The fourth DDL statement is an ALTER statement that alters the view View1 to select and thus include all columns from the table Table2. While the ALTER statement changes the object dependency of the view View1 from the table Table1 to the table Table2, the view metadata or view properties are not changed. Therefore, selective revalidation as described herein may include updating or refreshing object dependencies without revalidating dependent objects. In other words, a method for selective revalidation may determine whether the view properties of a data object changed after the ALTER statement, and decide to revalidate dependent objects (e.g., checking object validity and updating metadata for dependent objects) or update object dependency for dependent objects without revalidating (e.g., updating the base object of a dependent object but not checking validity or updating metadata for dependent objects).

As another illustrative and non-limiting example, consider the following DDL statements relating to a CREATE OR REPLACE PROCEDURE:

CREATE TABLE Table1(A INT NOT NULL, B VARCHAR(100) DEFAULT 'TEST1');
CREATE TABLE Table2(A INT NOT NULL, B VARCHAR(100) DEFAULT 'TEST1');
CREATE PROCEDURE Proc1( ) AS
BEGIN
　SELECT * FROM Table1;
END;
CREATE OR REPLACE PROCEDURE Proc1( ) AS
BEGIN
　SELECT * FROM Table2;
END;

In the above example, the base table is changed from Table1 to Table2 through the CREATE OR REPLACE PROCEDURE statement but the procedure property is not changed. Thus, according to the systems and methods provided herein, the object dependency may be refreshed while revalidation may not occur responsive to such a definition statement.

One example database system that may be improved by implementing the selective database revalidation and dependency refresh techniques described herein is SAP HANA™ of SAP SE of Walldorf, Germany.

Example 3—Method for Selective Revalidation and Dependency Refresh of Data Objects FIG. 4A shows a high-level flow chart illustrating an example method 400 for fine-grained decision of propagation of revalidation for data objects. Specifically, method 400 relates to selectively revalidating data objects and updating object dependencies of data objects. Method 400 is described with regard to the systems and components of FIG. 3, though it should be appreciated that the method 400 may be implemented with other systems and components without departing from the scope of the present disclosure.

Method 400 begins at 405. At 405, method 400 evaluates the current properties of a data object. The current properties of the data object may comprise, for example, object parameters defining the logical structure of the data object, including one or more number of attributes, names of the attributes, data types of the attributes, nullability uniqueness of values, and so on. To evaluate the current properties of the data object, method 400 may collect the object properties into a data object Pold, as an illustrative and non-limiting example. For example, method 400 may collect object properties, such as view metadata as depicted in the view metadata table 180, from a data object such as view metadata table 180. As another example, method 400 may retrieve object properties from a data dictionary storing such object properties. Alternatively, method 400 may collect object properties from the data object and update a data dictionary with the object properties.

At 410, method 400 receives a definition command for the data object. The definition command may comprise a DDL command relating to the data object, including but not limited to a CREATE command, an ALTER command, a DROP command, a TRUNCATE command, and so on. At 415, method 400 updates the object based on the definition command, which may include updating the metadata for the data object, the logical structure of the data object, and so on. After updating the object according to the definition command, method 400 continues to 420. At 420, method 400 evaluates the updated properties of the object. For example, method 400 may collect the object properties of the updated object into a data object Pnew, as an illustrative and non-limiting example.

Continuing at 425, method 400 determines whether the object properties changed. To determine whether the object properties changed after updating the object with the new definition, method 400 may compare the previous or old object properties evaluated at 405 (and saved, for example, as the data object Pold) with the new object properties evaluated at 420 (and saved, for example, as the data object Pnew). If the old object properties are identical to the new object properties (e.g., Pold=Pnew), then the object properties of the data object have not changed; otherwise, the object properties of the data object have changed. The object properties may comprise metadata defining the logical structure of the data object, such that the object properties change if the logical structure of the data object change. If the object properties changed ("YES"), method 400 continues to 430. At 430, method 400 revalidates dependent objects of the object. Method 400 may revalidate the dependent objects of the object, for example, by updating each dependent object and evaluating the validity of each dependent object. Method 400 then returns.

However, referring again to 425, if the object properties did not change ("NO"), method 400 continues to 435. At 435, method 400 evaluates object dependency for the object. For example, method 400 determines what data objects depend on the updated object. To that end, method 400 may access an object dependency table, such as the object dependency table 170, storing metadata regarding base objects, dependent objects, and dependency types. At 440, method 400 determines whether the object dependency changed. For example, method 400 may compare the object dependency after updating the object to the object dependency of the object before updating the object. Object dependency may change if the base object of a given dependent object changed. Thus, method 400 may determine whether a base object of the updated object changed as a result of the update at 415. If the object dependency did not change ("NO"), method 400 proceeds to 445. At 445, method 400 does not perform any revalidation or dependency refresh because such revalidation and dependency refresh are not necessary. Method 400 then returns.

However, referring again to 440, if the object dependency changed ("YES"), method 400 continues to 450. At 450, method 400 updates the object dependency of the object. For example, if the object depends on a different base object after applying the definition command, method 400 updates the object dependency accordingly, for example in an object dependency table such as the object dependency table 170. Method 400 may further update the dependency type for the dependency, for example to indicate whether the updated dependency between objects is direct or indirect. Continuing at 455, method 400 refreshes the object dependency for dependent objects of the object. Method 400 may refresh the object dependency for each dependent object depending on the object, for example, in topological order of a dependency tree for the object. Method 400 is able to refresh indirect base objects without performing revalidation because direct base objects are persistent. An example method for refreshing object dependencies without performing revalidation is described further herein with regard to FIGS. 5A and 5B. After refreshing the object dependency for dependent objects of the object, method 400 then returns.

Thus, a method is provided for fine-grained decision of propagation of revalidation. After changing a data object, the method includes propagating revalidation throughout data objects depending on the data object if object properties relating to the logical structure of the data object changed, refreshing object dependencies for such dependent data objects but not revalidating such dependent data objects if the object properties did not change, and not revalidating or refreshing dependencies if object properties and dependencies did not change. The method automatically performs this fine-grained decision responsive to a definition command for a data object. In this way, the validity of data objects in a database may be actively maintained without performing brute force revalidation for every dependent object after a definition command, regardless of whether or not the definition command changed a target data object. FIG. 4B depicts example pseudocode 470 for selectively revalidating data objects in response to executing a definition statement.

Example 4—Method for Refreshing Object Dependency of Data Objects

Figure 5A:
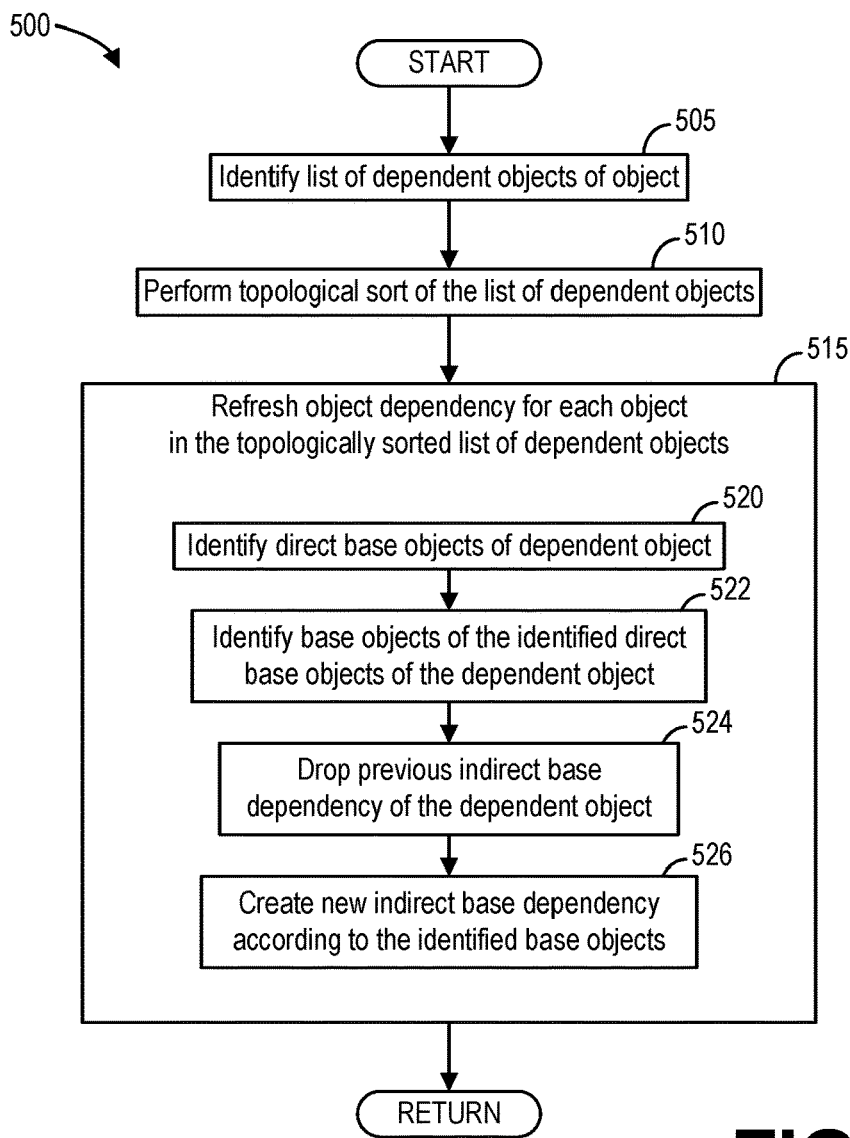
FIG. 5A is a high-level flow chart illustrating an example method for refreshing data object dependency, according to one example.

FIG. 5A shows a high-level flow chart illustrating an example method 500 for refreshing object dependency of data objects. Specifically, method 500 relates to updating object dependency of data objects even when revalidation of such data objects is skipped. As an illustrative and non-limiting example, method 500 may update an object dependency table, such as the object dependency table 170, storing metadata regarding object dependency of data objects. Method 500 may comprise a subroutine of method 400, for example, and may correspond to the action 455 of method 400 described hereinabove. Method 500 is described with regard to the systems, components, and methods of FIGS. 3 and 4, though it should be appreciated that the method 500 may be implemented with other systems, components, and methods without departing from the scope of the present disclosure.

Method 500 begins at 505. At 505, method 500 identifies a list of dependent objects for the object. For example, method 500 may collect dependent objects of the object, which comprises a root object in this instance, into a list. At 510, method 500 performs a topological sort of the list of dependent objects. For example, method 500 may perform a breadth-first topological sort on the dependent data objects to generate an ordered list (e.g., a stack, queue, or other data structure) of dependent data objects, where data objects are ordered based on dependencies (with data objects later in the list, or otherwise lower in a hierarchy, than their parent objects).

At 515, method 500 refreshes object dependency for each object in the topologically sorted list of dependent objects. In particular, method 500 may refresh the object dependency of each object in the order of the topologically sorted list of dependent objects, so that when object dependency is refreshed for a given object, the object dependencies of parent objects of the given object have already been refreshed.

To that end, for each dependent object in the topologically sorted list of dependent objects, method 500 may perform steps 520, 522, 524, and 526. For example, for a given dependent object, at 520, method 500 identifies direct base objects of the dependent object. For example, method 500 may collect direct base objects of the given dependent object into a data object (e.g., named directBaseObjects). At 522, method 500 identifies base objects of the identified direct base objects of the dependent object. For example, method 500 may collect base objects of each object in the identified direct base objects (e.g., directBaseObjects) into an additional data object (e.g., named newIndirectBaseObjects). At 524, method 500 drops the previous indirect base dependency of the given dependent object. Then, at 526, method 500 creates a new indirect base dependency according to the identified base objects (i.e., newIndirectBaseObjects).

Figure 5B:
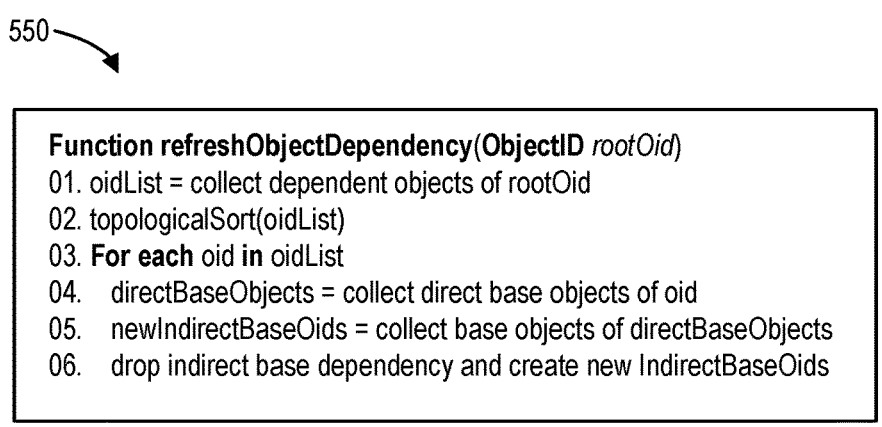
FIG. 5B shows example pseudocode for refreshing object dependency information.

In this way, method 500 efficiently updates or refreshes the object dependencies for each data object depending on the target data object. After refreshing the object dependency for all objects in the topologically sorted list of dependent objects, method 500 returns. An example of refreshing object dependency may include updating the metadata of an object dependency table, such as the object dependency table 250, so that entries of the object dependency table accurately indicate the base objects of dependent objects. FIG. 5B shows example pseudocode 550 for refreshing object dependency of data objects.

Figure 6A:
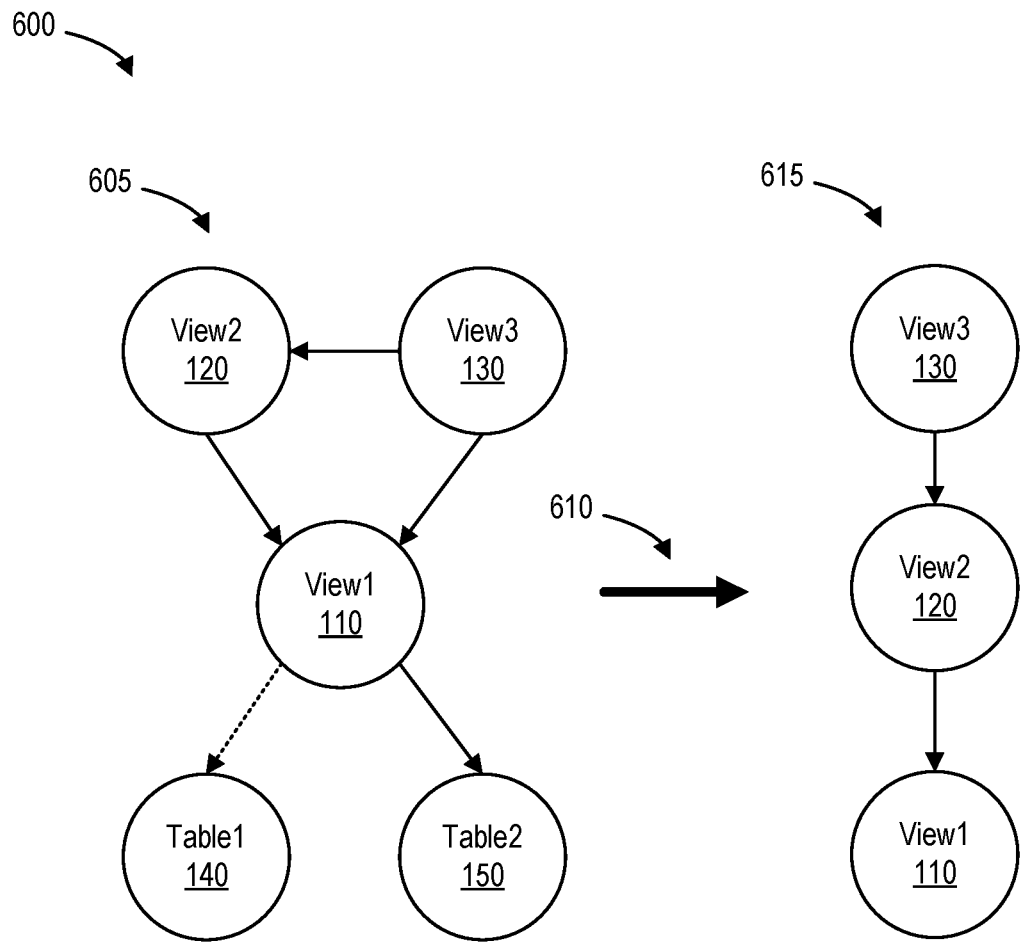
FIG. 6A is a diagram illustrating an example data object dependency refresh applied to the set of interrelated data objects of FIG. 1A.

Example 5—Illustrative Use Case for Refreshing Object Dependency of Data Objects FIG. 6A shows a diagram 600 illustrating a set 605 of data objects and the generation 610 of a dependency tree 615 sorted by topological order. As depicted, the set 605 of data objects may correspond to the set 215 of data objects after applying the change 210 to the set 100 of data objects, for example, such that the dependency or base object of the data object View1 110 changes from the data object Table1 140 to the data object Table2 150. As the data object View1 110 is the subject of the definition command, the data object View1 110 is therefore the root object of the topological sort 610. As a result of the dependency tree generation 610, the dependency tree 615 sorted by topological order shows the data object View3 130 depending on the data object View2 120, and the data object View2 120 depending on the data object View1 110.

Figure 6B:
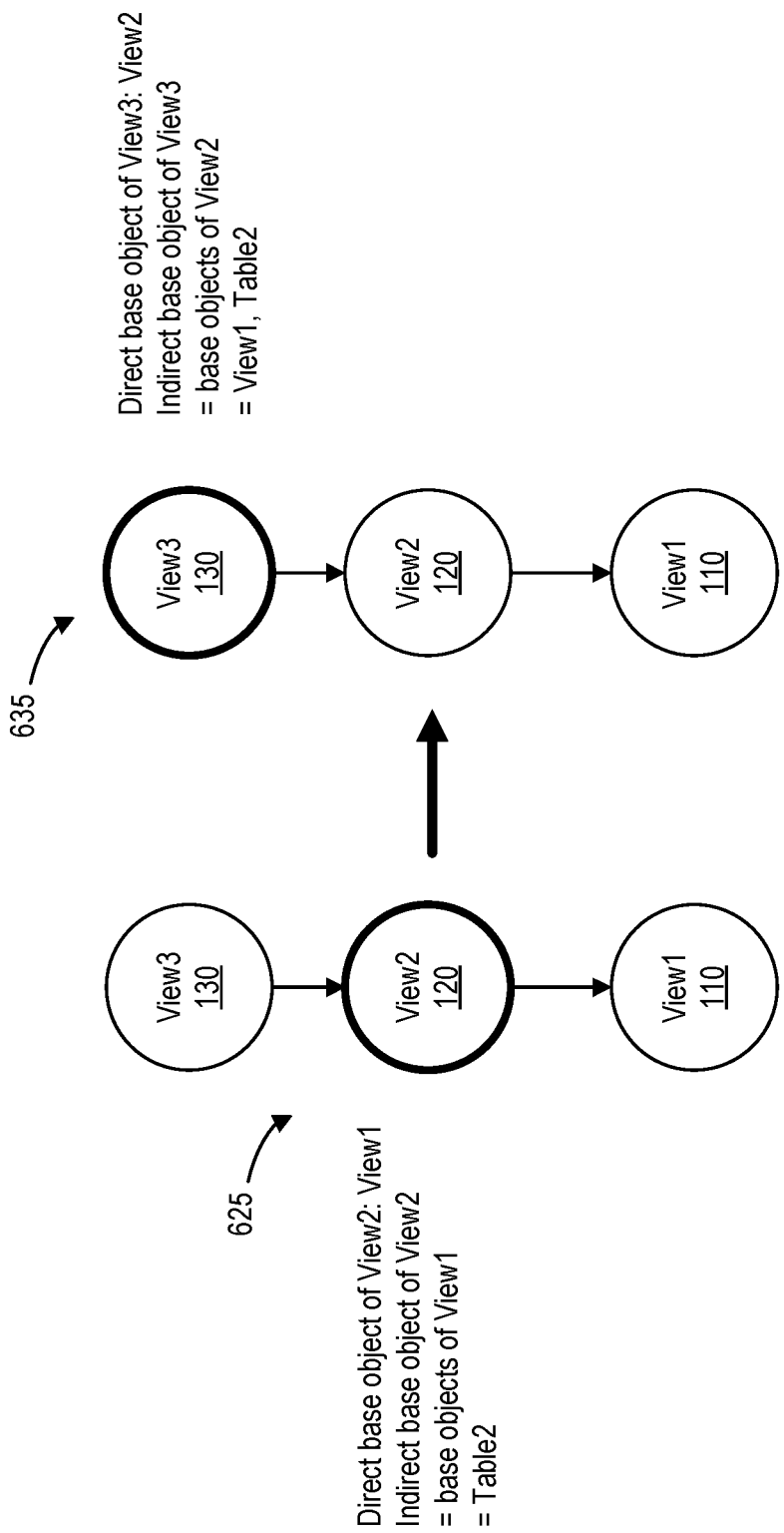
FIG. 6B is a diagram illustrating example data object dependency refresh applied of interrelated data objects of FIG. 1A in topological order.

When refreshing the object dependency of data objects as described hereinabove with regard to FIG. 5A, the object dependencies of the data objects in the dependency tree 615 are updated in the order depicted. First, the object dependency of the data object View1 110 is updated or refreshed to indicate the data object Table2 150 as the base object. Next, as depicted in FIG. 6B, the object dependency of the data object View2 120 is updated or refreshed at 625 to indicate the data object Table2 150 as the base object. Next, the object dependency of the data object View3 130 is updated or refreshed at 635 to indicate the data object Table2 150 as the base object. While the object dependency in this depicted example is simple, it should be appreciated that refreshing object dependencies in this way ensures that object dependencies are accurately refreshed in examples with more complex interdependence among a larger plurality of data objects and base data objects.

Figure 7:
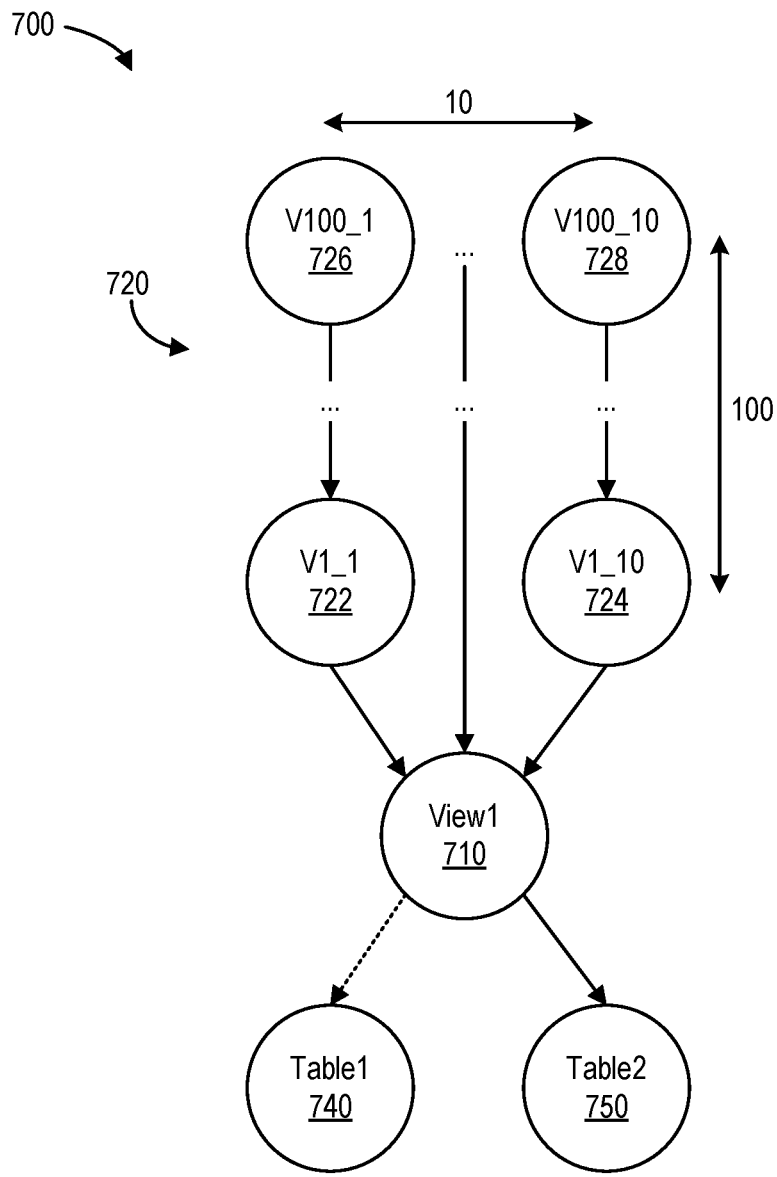
FIG. 7 is a diagram illustrating an example set of interrelated data objects, according to one example.

Example 6—Advantages of Selective Revalidation and Dependency Refresh of Data Objects FIG. 7 shows a diagram illustrating an example set 700 of data objects. Similar to the example set depicted in FIG. 1A, the set 700 includes a data object View1 710, a data object Table1 740, and a data object Table2 750, where the data object View1 710 is updated to depend from the data object Table2 750 instead of the data object Table1 740. In contrast with the set 100 of data objects depicted in FIG. 1A, however, a large plurality of data objects 720 depend from the data object View1 710. In this example scenario, the large plurality of data objects 720 includes at least 1,000 dependent objects depending on the data object View1 710, such that the depth of the dependency tree is 100 and there are 10 data objects at each level. The large plurality of data objects 720 thus includes data objects V1_1 722, V1_10 724, V100_1 726, V100_10 728, and all the data objects therebetween not explicitly shown but indicated by ellipses in FIG. 7.

After performing a change such as "ALTER VIEW View1 AS SELECT * FROM Table2" to change the base table from Table1 740 to Table2 750, the elapsed time when fully revalidating all of the dependent data objects may comprise 33 seconds, as an illustrative example. In contrast, the elapsed time for performing the same change when skipping the revalidation and only refreshing object dependencies is 0.5 seconds. In this way, the selective revalidation and dependency refreshing techniques described herein provide substantial improvements in database management because the amount of computational resources dedicated to processing updates to massive databases, as well as the amount of time spent processing such updates, can be significantly reduced (e.g., by orders of magnitude). Such improvements to the performance of database management increase with the size and complexity of databases.

Example 7—Additional Processes for Executing on Data Objects

Figure 8:
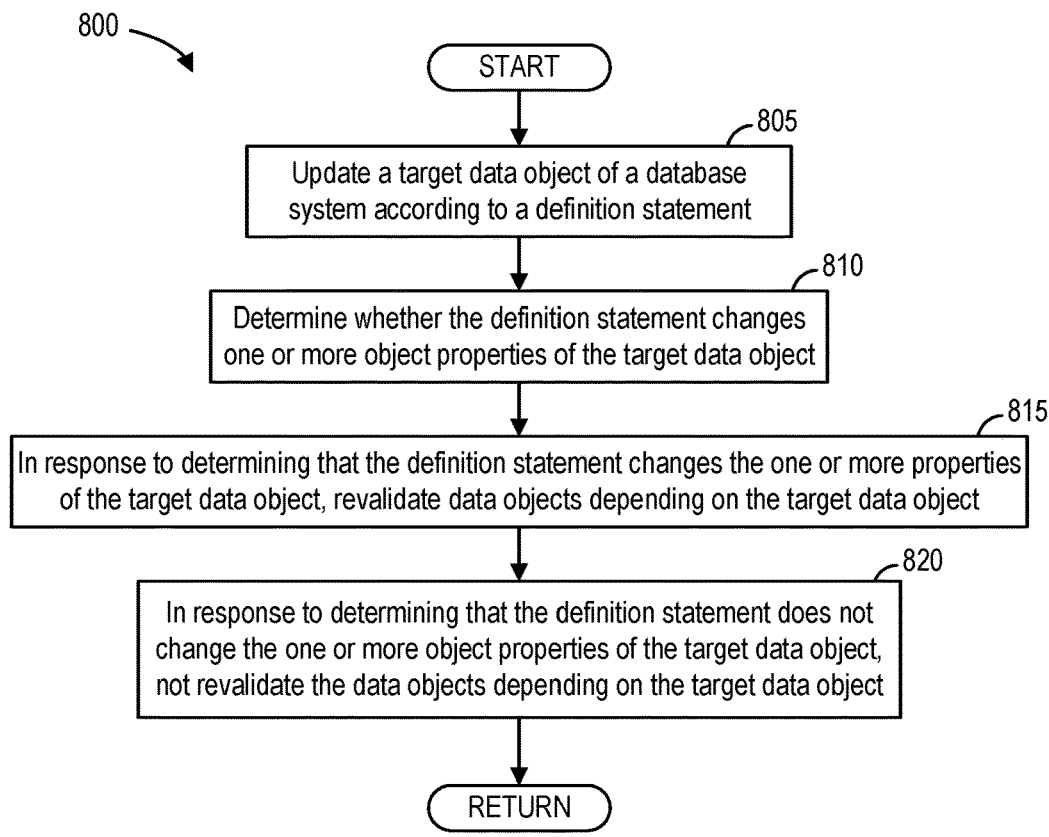
FIG. 8 is a high-level flow chart illustrating an example method for selectively revalidating database objects, according to one example.
Figure 9:
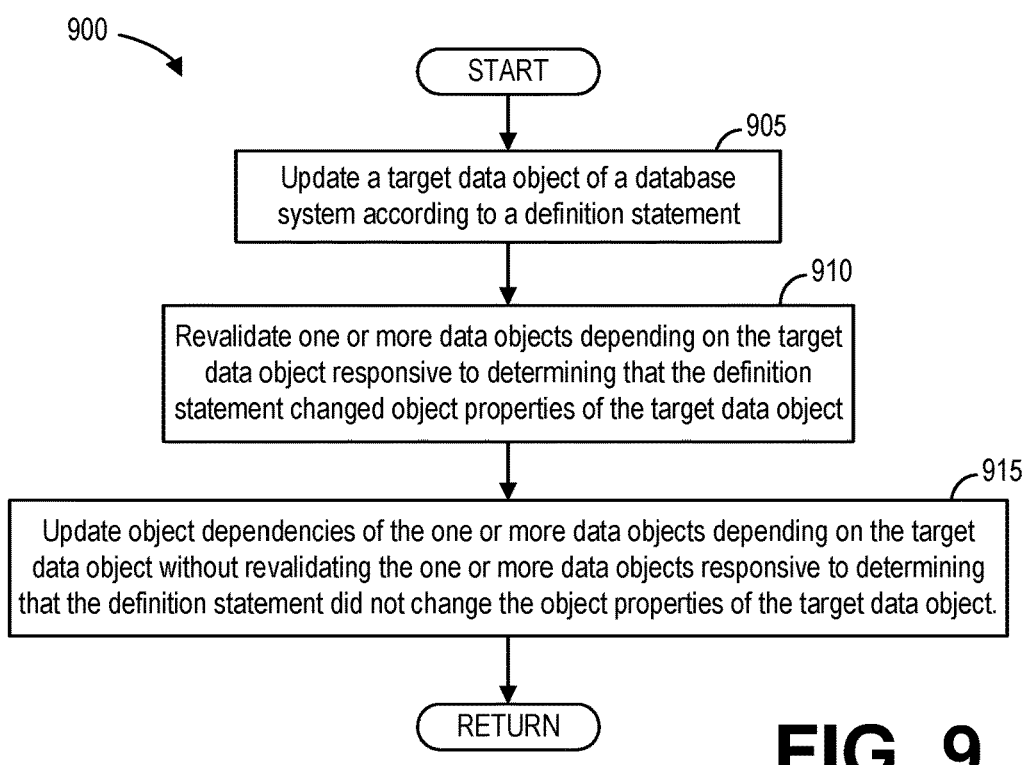
FIG. 9 is a high-level flow chart illustrating an example method for updating database objects with selective revalidation, according to one example.

FIG. 8 shows a high-level flow chart illustrating an example method 800 for selectively revalidating data objects and updating object dependencies of data objects. Method 800 begins at 805. At 805, method 800 updates a target data object of a database system according to a definition statement. At 810, method 800 determines whether the definition statement changes one or more object properties of the target data object. At 815, in response to determining that the definition statement changes the one or more properties of the target data object, method 800 revalidates data objects depending on the target data object. At 820, in response to determining that the definition statement does not change the one or more object properties of the target data object, method 800 does not revalidate the data objects depending on the target data object. Method 800 thus returns. FIG. 9 shows a high-level flow chart illustrating an example method 900 for selectively revalidating data objects and updating object dependencies of data objects. Method 900 begins at 905. At 905, method 900 updates a target data object of a database system according to a definition statement. At 910, method 900 revalidates one or more data objects depending on the target data object responsive to determining that the definition statement changed object properties of the target data object. At 915, method 900 updates object dependencies of the one or more data objects depending on the target data object without revalidating the one or more data objects responsive to determining that the definition statement did not change the object properties of the target data object. Method 900 thus returns.

Figure 10:
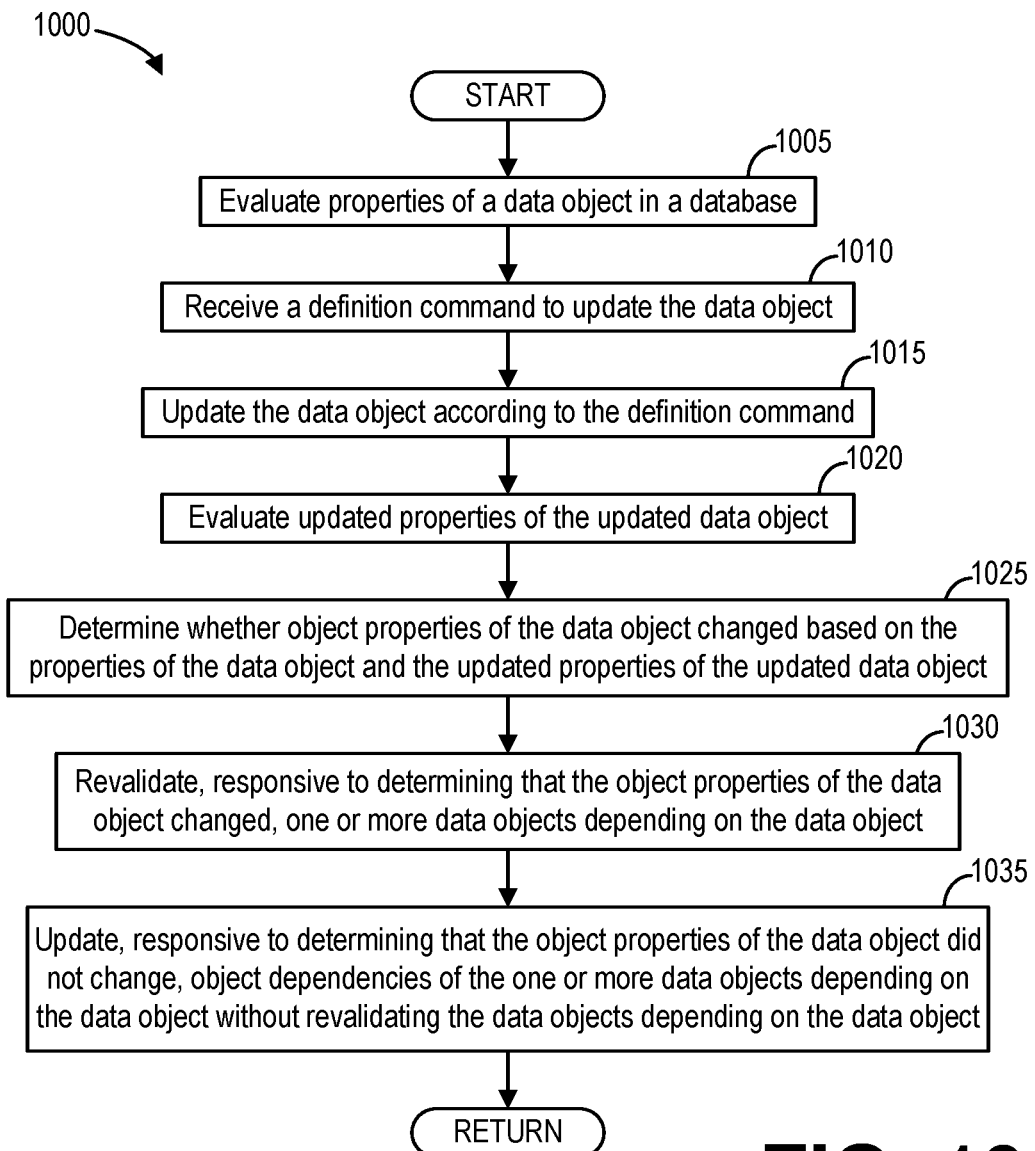
FIG. 10 is a high-level flow chart illustrating an example method for updating data objects and selectively revalidating dependent data objects, according to one example.

FIG. 10 shows a high-level flow chart illustrating an example method 1000 for selectively revalidating data objects and updating object dependencies of data objects. Method 1000 begins at 1005. At 1005, method 1000 evaluates properties of a data object in a database. At 1010, method 1000 receives a definition command to update the data object. At 1015, method 1000 updates the data object according to the definition command. At 1020, method 1000 evaluates updated properties of the updated data object. At 1025, method 1000 determines whether object properties of the data object changed based on the properties of the data object and the updated properties of the updated data object. At 1030, method 1000 revalidates, responsive to determining that the object properties of the data object changed, one or more data objects depending on the data object. At 1035, method 1000 updates, responsive to determining that the object properties of the data object did not change, object dependencies of the one or more data objects depending on the data object without revalidating the data objects depending on the data object. Method 1000 thus returns.

Example 8—Computing Environments

Figure 11:
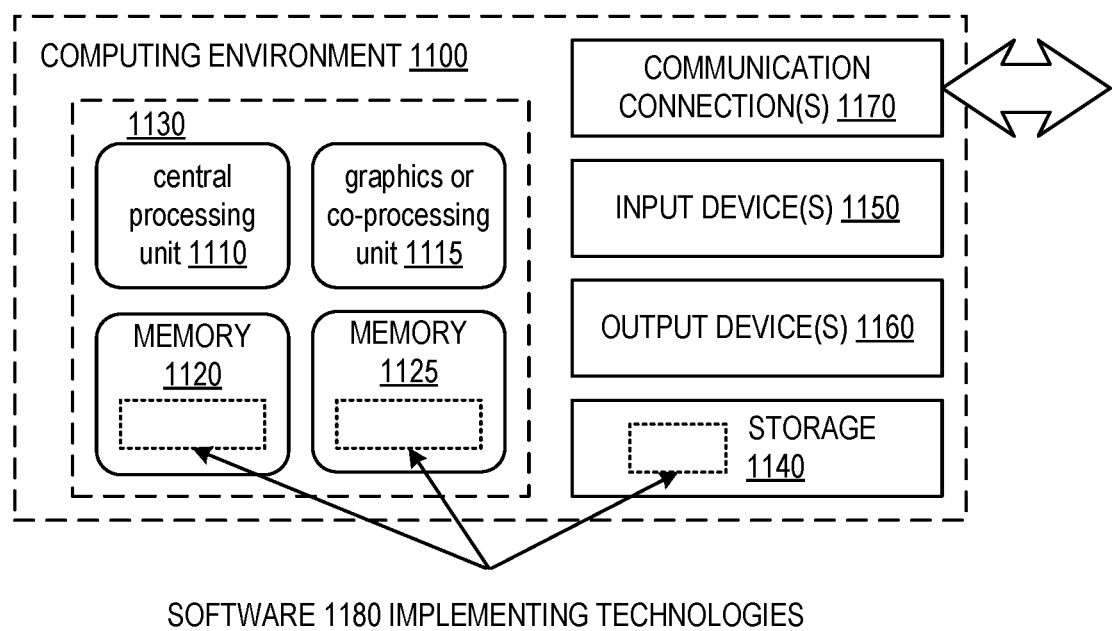
FIG. 11 is a block diagram illustrating an example computing system in which described embodiments can be implemented.

FIG. 11 depicts an example of a suitable computing system 1100 in which the described innovations can be implemented. The computing system 1100 is not intended to suggest any limitation as to scope of use or functionality of the present disclosure, as the innovations can be implemented in diverse computing systems.

With reference to FIG. 11, the computing system 1100 includes one or more processing units 1110, 1115 and memory 1120, 1125. In FIG. 11, this basic configuration 1130 is included within a dashed line. The processing units 1110, 1115 can execute computer-executable instructions, such as for implementing the features described in the examples herein (e.g., the methods 400, 500, 800, 900, and 1000). A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 11 shows a central processing unit 1110 as well as a graphics processing unit or co-processing unit 1115. The tangible memory 1120, 1125 can be volatile memory (e.g., registers, cache, RAM), non-volatile memory (e.g., ROM, EEPROM, flash memory, etc.), or some combination of the two, accessible by the processing unit(s) 1110, 1115. The memory 1120, 1125 can store software 1180 implementing one or more innovations described herein, in the form of computer-executable instructions suitable for execution by the processing unit(s) 1110, 1115.

Computing system 1100 can have additional features. For example, the computing system 1100 can include storage 1140, one or more input devices 1150, one or more output devices 1160, and one or more communication connections 1170, including input devices, output devices, and communication connections for interacting with a user. An interconnection mechanism (not shown) such as a bus, controller, or network can interconnect the components of the computing system 1100. Typically, operating system software (not shown) can provide an operating environment for other software executing in the computing system 1100, and coordinate activities of the components of the computing system 1100.

The tangible storage 1140 can be removable or non-removable, and includes magnetic disks, magnetic tapes or cassettes, CD-ROMs, DVDs, or any other medium which can be used to store information in a non-transitory way, and which can be accessed within the computing system 1100. The storage 1140 can store instructions for the software 1180 implementing one or more innovations described herein.

The input device(s) 1150 can be an input device such as a keyboard, mouse, pen, or trackball, a voice input device, a scanning device, touch device (e.g., touchpad, display, or the like) or another device that provides input to the computing system 1100. The output device(s) 1160 can be a display, printer, speaker, CD-writer, or another device that provides output from the computing system 1100.

The communication connection(s) 1170 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer, and should not be confused with acts performed by a human being. The actual computer operations corresponding to these terms vary depending on implementation.

Example 9—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 10—Cloud Computing Environments

Figure 12:
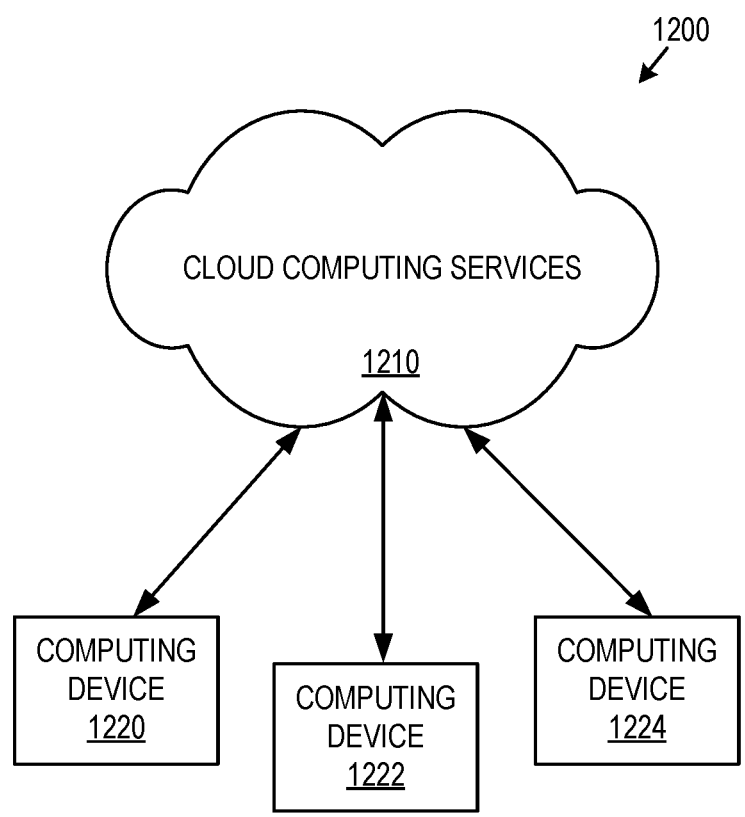
FIG. 12 is a block diagram illustrating an example cloud computing environment that can be used in conjunction with the technologies described herein.

FIG. 12 depicts an example cloud computing environment 1200 in which the described technologies can be implemented, including, e.g., the computing system 1100 and other systems herein such as the database management system 302. The cloud computing environment 1200 can include cloud computing services 1210. The cloud computing services 1210 can comprise various types of cloud computing resources, such as computer servers, data storage repositories, networking resources, etc. The cloud computing services 1210 can be centrally located (e.g., provided by a data center of a business or organization) or distributed (e.g., provided by various computing resources located at different locations, such as different data centers and/or located in different cities or countries).

The cloud computing services 1210 can be utilized by various types of computing devices (e.g., client computing devices), such as computing devices 1220, 1222, and 1223. For example, the computing devices (e.g., 1220, 1222, and 1224) can be computers (e.g., desktop or laptop computers), mobile devices (e.g., tablet computers or smart phones), or other types of computing devices. For example, the computing devices (e.g., 1220, 1222, and 1224) can utilize the cloud computing services 1210 to perform computing operations (e.g., data processing, data storage, and the like).

In practice, cloud-based, on-premises-based, or hybrid scenarios can be supported.

Example 11—Example Database Architecture

Database systems commonly operate using online transaction processing (OLTP) workloads, which are typically transaction-oriented, or online analytical processing (OLAP) workloads, which typically involve data analysis. OLTP transactions are commonly used for core business functions, such as entering, manipulating, or retrieving operational data, and users typically expect transactions or queries to be completed quickly. For example, OLTP transactions can include operations such as INSERT, UPDATE, and DELETE, and comparatively simple queries. OLAP workloads typically involve queries used for enterprise resource planning and other types of business intelligence. OLAP workloads commonly perform few, if any, updates to database records, rather, they typically read and analyze past transactions, often in large numbers.

Figure 13:
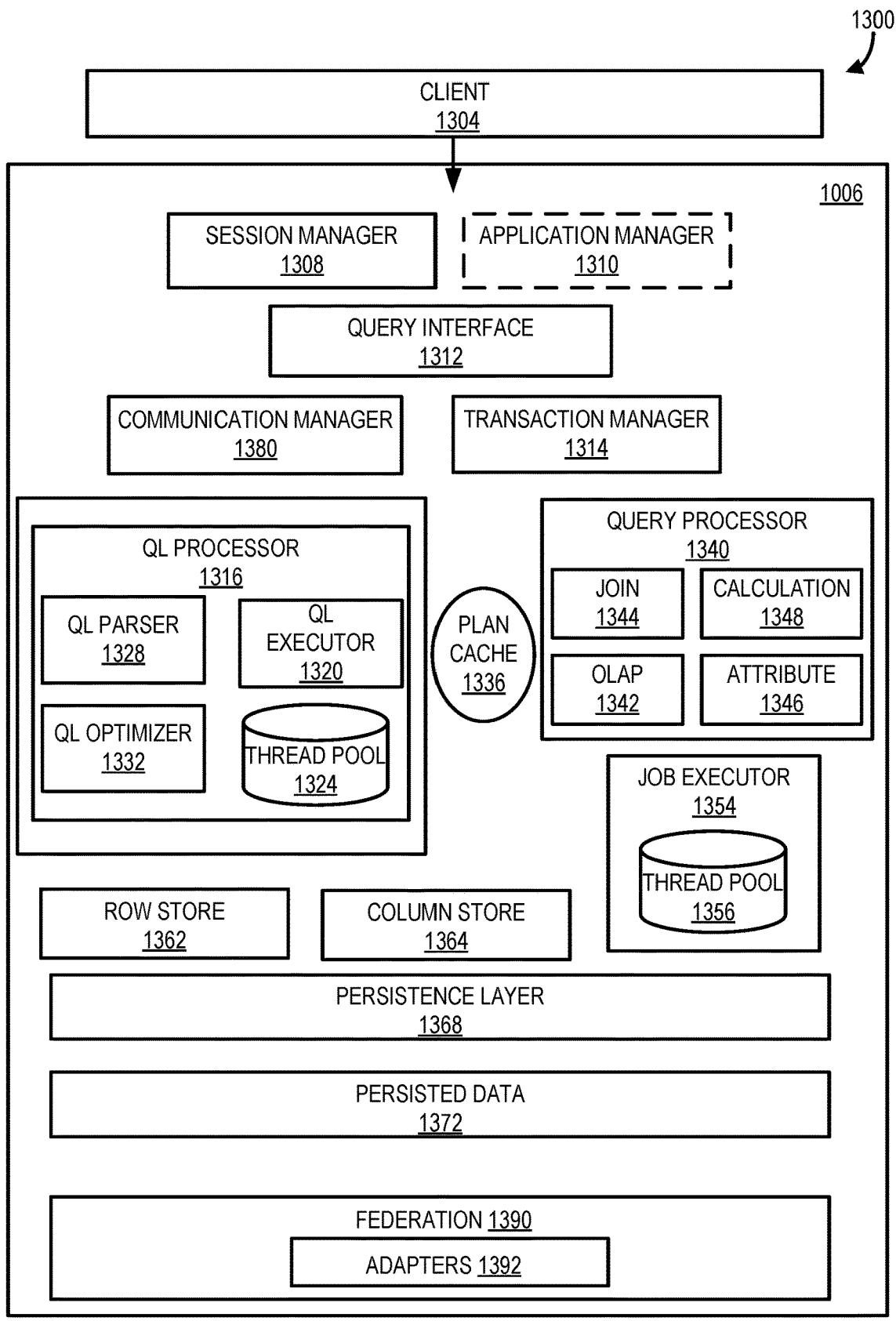
FIG. 13 is a block diagram illustrating an example database system which can be used in implementing aspects of disclosed technologies.

FIG. 13 illustrates an example database environment 1300. The database environment 1300 can include a client 1304. Although a single client 1304 is shown, the client 1304 can represent multiple clients. The client or clients 1304 may be OLAP clients, OLTP clients, or a combination thereof.

The client 1304 is in communication with a database server 1306. Through various subcomponents, the database server 1306 can process requests for database operations, such as requests to store, read, or manipulate data (i.e., CRUD operations). A session manager component 1308 can be responsible for managing connections between the client 1304 and the database server 1306, such as clients communicating with the database server using a database programming interface, such as Java Database Connectivity (JDBC), Open Database Connectivity (ODBC), or Database Shared Library (DBSL). Typically, the session manager 1308 can simultaneously manage connections with multiple clients 1304. The session manager 1308 can carry out functions such as creating a new session for a client request, assigning a client request to an existing session, and authenticating access to the database server 1306. For each session, the session manager 1308 can maintain a context that stores a set of parameters related to the session, such as settings related to committing database transactions or the transaction isolation level (such as statement level isolation or transaction level isolation).

For other types of clients 1304, such as web-based clients (such as a client using the HTTP protocol or a similar transport protocol), the client can interface with an application manager component 1310. Although shown as a component of the database server 1306, in other implementations, the application manager 1310 can be located outside of, but in communication with, the database server 1306. The application manager 1310 can initiate new database sessions with the database server 1306, and carry out other functions, in a similar manner to the session manager 1308.

The application manager 1310 can determine the type of application making a request for a database operation and mediate execution of the request at the database server 1306, such as by invoking or executing procedure calls, generating query language statements, or converting data between formats useable by the client 1304 and the database server 1306. In particular examples, the application manager 1310 receives requests for database operations from a client 1304, but does not store information, such as state information, related to the requests.

Once a connection is established between the client 1304 and the database server 1306, including when established through the application manager 1310, execution of client requests is usually carried out using a query language, such as the structured query language (SQL). In executing the request, the session manager 1308 and application manager 1310 may communicate with a query interface 1312. The query interface 1312 can be responsible for creating connections with appropriate execution components of the database server 1306. The query interface 1312 can also be responsible for determining whether a request is associated with a previously cached statement or a stored procedure, and calling the stored procedure or associating the previously cached statement with the request.

At least certain types of requests for database operations, such as statements in a query language to write data or manipulate data, can be associated with a transaction context. In at least some implementations, each new session can be assigned to a transaction. Transactions can be managed by a transaction manager component 1314. The transaction manager component 1314 can be responsible for operations such as coordinating transactions, managing transaction isolation, tracking running and closed transactions, and managing the commit or rollback of transactions. In carrying out these operations, the transaction manager 1314 can communicate with other components of the database server 1306.

The query interface 1312 can communicate with a query language processor 1316, such as a structured query language processor. For example, the query interface 1312 may forward to the query language processor 1316 query language statements or other database operation requests from the client 1304. The query language processor 1316 can include a query language executor 1320, such as a SQL executor, which can include a thread pool 1324. Some requests for database operations, or components thereof, can be executed directly by the query language processor 1316. Other requests, or components thereof, can be forwarded by the query language processor 1316 to another component of the database server 1306. For example, transaction control statements (such as commit or rollback operations) can be forwarded by the query language processor 1316 to the transaction manager 1314. In at least some cases, the query language processor 1316 is responsible for carrying out operations that retrieve or manipulate data (e.g., SELECT, UPDATE, DELETE). Other types of operations, such as queries, can be sent by the query language processor 1316 to other components of the database server 1306. The query interface 1312, and the session manager 1308, can maintain and manage context information associated with requests for database operation. In particular implementations, the query interface 1312 can maintain and manage context information for requests received through the application manager 1310.

When a connection is established between the client 1304 and the database server 1306 by the session manager 1308 or the application manager 1310, a client request, such as a query, can be assigned to a thread of the thread pool 1324, such as using the query interface 1312. In at least one implementation, a thread is associated with a context for executing a processing activity. The thread can be managed by an operating system of the database server 1306, or by, or in combination with, another component of the database server. Typically, at any point, the thread pool 1324 contains a plurality of threads. In at least some cases, the number of threads in the thread pool 1324 can be dynamically adjusted, such in response to a level of activity at the database server 1306. Each thread of the thread pool 1324, in particular aspects, can be assigned to a plurality of different sessions.

When a query is received, the session manager 1308 or the application manager 1310 can determine whether an execution plan for the query already exists, such as in a plan cache 1336. If a query execution plan exists, the cached execution plan can be retrieved and forwarded to the query language executor 1320, such as using the query interface 1312. For example, the query can be sent to an execution thread of the thread pool 1324 determined by the session manager 1308 or the application manager 1310. In a particular example, the query plan is implemented as an abstract data type.

If the query is not associated with an existing execution plan, the query can be parsed using a query language parser 1328. The query language parser 1328 can, for example, check query language statements of the query to make sure they have correct syntax, and confirm that the statements are otherwise valid. For example, the query language parser 1328 can check to see if tables and records recited in the query language statements are defined in the database server 1306.

The query can also be optimized using a query language optimizer 1332. The query language optimizer 1332 can manipulate elements of the query language statement to allow the query to be processed more efficiently. For example, the query language optimizer 1332 may perform operations such as unnesting queries or determining an optimized execution order for various operations in the query, such as operations within a statement. After optimization, an execution plan can be generated, or compiled, for the query. In at least some cases, the execution plan can be cached, such as in the plan cache 1336, which can be retrieved (such as by the session manager 1308 or the application manager 1310) if the query is received again.

For the purposes of the present disclosure, one task that can be performed by the query language optimizer 1332 is determining a location where a request for a database operation, or a portion thereof, should be performed. For instance, a complex query may be submitted that reads data from multiple data sources. At least one of the data sources may be a virtual table, and the request can be performed on an anchor node, such as a node represented by a computing system implementing the database environment 1300, or another node, including a node that was dynamically created in response to a request for a database operation, another request for a database operation, or based on overall workload/performance of a database system that include one or more nodes (that is, if a workload exceeds a threshold, a non-anchor node can be instantiated).

Once a query execution plan has been generated or received, the query language executor 1320 can oversee the execution of an execution plan for the query. For example, the query language executor 1320 can invoke appropriate subcomponents of the database server 1306.

In executing the query, the query language executor 1320 can call a query processor 1340, which can include one or more query processing engines. The query processing engines can include, for example, an OLAP engine 1342, a join engine 1344, an attribute engine 1346, or a calculation engine 1348. The OLAP engine 1342 can, for example, apply rules to create an optimized execution plan for an OLAP query. The join engine 1344 can be used to implement relational operators, typically for non-OLAP queries, such as join and aggregation operations. In a particular implementation, the attribute engine 1346 can implement column data structures and access operations. For example, the attribute engine 1346 can implement merge functions and query processing functions, such as scanning columns.

In certain situations, such as if the query involves complex or internally parallelized operations or sub-operations, the query executor 1320 can send operations or sub-operations of the query to a job executor component 1354, which can include a thread pool 1356. An execution plan for the query can include a plurality of plan operators. Each job execution thread of the job execution thread pool 1356, in a particular implementation, can be assigned to an individual plan operator. The job executor component 1354 can be used to execute at least a portion of the operators of the query in parallel. In some cases, plan operators can be further divided and parallelized, such as having operations concurrently access different parts of the same table. Using the job executor component 1354 can increase the load on one or more processing units of the database server 1306, but can improve execution time of the query.

The query processing engines of the query processor 1340 can access data stored in the database server 1306. Data can be stored in a row-wise format in a row store 1362, or in a column-wise format in a column store 1364. In at least some cases, data can be transformed between a row-wise format and a column-wise format. A particular operation carried out by the query processor 1340 may access or manipulate data in the row store 1362, the column store 1364, or, at least for certain types of operations (such a join, merge, and subquery), both the row store 1362 and the column store 1364. In at least some aspects, the row store 1362 and the column store 1364 can be maintained in main memory.

A persistence layer 1368 can be in communication with the row store 1362 and the column store 1364. The persistence layer 1368 can be responsible for actions such as committing write transaction, storing redo log entries, rolling back transactions, and periodically writing data to storage to provided persisted data 1372.

In executing a request for a database operation, such as a query or a transaction, the database server 1306 may need to access information stored at another location, such as another database server. The database server 1306 may include a communication manager 1380 component to manage such communications. The communication manger 1380 can also mediate communications between the database server 1306 and the client 1304 or the application manager 1310, when the application manager is located outside of the database server.

In some cases, the database server 1306 can be part of a distributed database system that includes multiple database servers. At least a portion of the database servers may include some or all of the components of the database server 1306. The database servers of the database system can, in some cases, store multiple copies of data. For example, a table may be replicated at more than one database server. In addition, or alternatively, information in the database system can be distributed between multiple servers. For example, a first database server may hold a copy of a first table and a second database server can hold a copy of a second table. In yet further implementations, information can be partitioned between database servers. For example, a first database server may hold a first portion of a first table and a second database server may hold a second portion of the first table.

In carrying out requests for database operations, the database server 1306 may need to access other database servers, or other information sources, within the database system, or at external systems, such as an external system on which a remote data object is located. The communication manager 1380 can be used to mediate such communications. For example, the communication manager 1380 can receive and route requests for information from components of the database server 1306 (or from another database server) and receive and route replies.

The database server 1306 can include components to coordinate data processing operations that involve remote data sources. In particular, the database server 1306 includes a data federation component 1390 that at least in part processes requests to access data maintained at remote system. In carrying out its functions, the data federation component 1390 can include one or more adapters 1392, where an adapter can include logic, settings, or connection information usable in communicating with remote systems, such as in obtaining information to help generate virtual parameterized data objects or to execute requests for data using virtual parameterized data objects (such as issuing a request to a remote system for data accessed using a corresponding parameterized data object of the remote system). Examples of adapters include "connectors" as implemented in technologies available from SAP SE, of Walldorf, Germany. Further, disclosed techniques can use technologies underlying data federation techniques such as Smart Data Access (SDA) and Smart Data Integration (SDI) of SAP SE.

Example 12—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

Example 13—Example Embodiments

Any of the following example embodiments can be implemented.

In one example, a computing system comprises memory, one or more hardware processors coupled to the memory, and one or more computer-readable storage media storing instructions that, when loaded into the memory, cause the one or more hardware processors to: update a target data object of a database system according to a definition statement, revalidate data objects depending on the target data object responsive to the definition statement changing object properties of the target data object while updating the target data object, and not revalidate the data objects depending on the target data object responsive to the definition statement not changing the object properties of the target data object while updating the target data object.

In a first example of the computing system, the one or more computer-readable storage media further store instructions that, when executed, cause the one or more hardware processors to determine that object dependencies of the target data object changed, and update object dependencies of the data objects depending on the target data object responsive to the definition statement not changing the object properties of the target data object while updating the target data object. In a second example of the computing system optionally including the first example, to update the object dependencies of the data objects depending on the target data object, the one or more computer-readable storage media further store instructions that, when executed, cause the one or more hardware processors to determine a base data object for a given data object depending on the target data object, and update object dependency metadata for the given data object according to the determined base data object. In a third example of the computing system optionally including one or more of the first and second examples, the one or more computer-readable storage media further store instructions that, when executed, cause the one or more hardware processors to generate a topologically sorted ordered list of data objects depending on the target data object, and update the object dependencies of the data objects depending on the target data object according to the topologically sorted ordered list of data objects depending on the target data object. In a fourth example of the computing system optionally including one or more of the first through third examples, the one or more computer-readable storage media further store instructions that, when executed, cause the one or more hardware processors to not revalidate the data objects depending on the target data object and not update the object dependencies of the data objects depending on the target data object responsive to the definition statement not changing the object properties of the target data object and the definition statement not changing object dependencies of the target data object. In a fifth example of the computing system optionally including one or more of the first through fourth examples, the one or more computer-readable storage media further store instructions that, when executed, cause the one or more hardware processors to evaluate properties of the target data object before updating the target data object, evaluate properties of the target data object after updating the target data object, and determine whether the object properties of the target data object changed by comparing the properties of the target data object before updating the target data object with the properties of the target data object after updating the target data object. In a sixth example of the computing system optionally including one or more of the first through fifth examples, the definition statement comprises a Data Definition Language command. In a seventh example of the computing system optionally including one or more of the first through sixth examples, the Data Definition Language command comprises a CREATE, ALTER, or REPLACE command.

In another example, a computer-implemented method comprises updating a target data object of a database system according to a definition statement, revalidating one or more data objects depending on the target data object response to determining that the definition statement changed object properties of the target data object, and updating object dependencies of the one or more data objects depending on the target data object without revalidating the one or more data objects responsive to determining that the definition statement did not change the object properties of the target data object.

In a first example of the method, the method further comprises comparing a logical structure of the target data object before and after updating the target data object, determining that the definition statement changed the object properties of the target data object if the logical structure changed after updating the target data object, and determining that the definition statement did not change the object properties of the target data object if the logical structure did not change after updating the target data object. In a second example of the method optionally including the first example, the method further comprises receiving the definition statement, and automatically updating the target data object according to the definition statement responsive to receiving the definition statement. In a third example of the method optionally including one or more of the first and second examples, the method further comprises determining a base data object for a given data object of the one or more data objects depending on the target data object, and updating object dependency metadata for the given data object of the one or more data objects depending on the target data object according to the determined base data object. In a fourth example of the method optionally including one or more of the first through third examples, the target data object comprises a table or a view. In a fifth example of the method optionally including one or more of the first through fourth examples, revalidating the one or more data objects comprises testing validity of one or more parent objects of the one or more data objects. In a sixth example of the method optionally including one or more of the first through fifth examples, the method further comprises, prior to updating the target data object according to the definition statement, determining that the definition statement will change object properties of the target data object, determine that a data object depends on the object properties of the target data object, and outputting a message indicating that the definition statement may invalidate at least one dependent object.

In yet another example, one or more non-transitory computer-readable storage media store computer-executable instructions that when executed cause one or more processors to perform a method, the method comprising: evaluating properties of a data object in a database; receiving a definition command to update the data object; updating the data object according to the definition command; evaluating updated properties of the updated data object; determining whether object properties of the data object changed based on the properties of the data object and the updated properties of the updated data object; revalidating, responsive to determining that the object properties of the data object changed, one or more data objects depending on the data object; and updating, responsive to determining that the object properties of the data object did not change, object dependencies of the one or more data objects depending on the data object without revalidating the data objects depending on the data object.

In a first example of the one or more non-transitory computer-readable storage media, the method further comprises updating the object dependencies of the one or more data objects according to a topologically sorted list of the one or more data objects. In a second example of the one or more non-transitory computer-readable storage media optionally including the first example, determining whether the object properties of the data object changed comprises: comparing a logical structure of the data object before and after updating the data object; determining that the object properties of the data object changed if the logical structure changed after updating the data object; and determining that the object properties of the data object did not change if the logical structure did not change after updating the data object. In a third example of the one or more non-transitory computer-readable storage media optionally including one or more of the first and second examples, the definition command comprises a Data Definition Language statement. In a fourth example of the one or more non-transitory computer-readable storage media optionally including one or more of the first through third examples, the Data Definition Language statement comprises one or more of a CREATE statement, an ALTER statement, and a REPLACE statement indicating the data object. In a fifth example of the one or more non-transitory computer-readable storage media optionally including one or more of the first through fourth examples, the data object comprises a table or a view.

Example 14—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

We claim:

1. A computing system, comprising:
at least one memory;
one or more hardware processors coupled to the at least one memory; and
one or more computer-readable storage media storing instructions that, when executed by the computing system, cause the computing system to:
receive a definition statement to update a target data object of a set of related data objects;
execute the definition statement to update a definition of the target data object of a database system according to the definition statement;
perform operations to:
(1) in response to determining that the definition statement changes the one or more object properties of the target data object, revalidate data objects depending on the target data object; and otherwise
(2) in response to determining that the definition statement does not change the one or more object properties of the target data object, skip validation of the data objects depending on the target data object and update object dependencies of the data objects depending on the target data objects based on changed object dependencies of the target data object; and
execute a query using one or more data objects of the target data object or the data objects depending on the target data object after revalidation of the one or more data objects depending on the target data object or updating of object dependencies of the one or more data objects depending on the target data object, increasing a likelihood of successful query execution by confirming that object dependencies are correct and up to date.

2. The computing system of claim 1, wherein, to update the object dependencies of the data objects depending on the target data object, the one or more computer-readable storage media further store instructions that, when executed, cause the one or more hardware processors to:
determine a base data object for a given data object depending on the target data object; and
update object dependency metadata for the given data object according to the determined base data object.

3. The computing system of claim 2, wherein the one or more computer-readable storage media further store instructions that, when executed, cause the one or more hardware processors to:
generate a topologically sorted ordered list of data objects depending on the target data object; and
update the object dependencies of the data objects depending on the target data object according to the topologically sorted ordered list of data objects depending on the target data object.

4. The computing system of claim 1, wherein the one or more computer-readable storage media further store instructions that, when executed, cause the one or more hardware processors to, in response to determining that the definition statement does not change the one or more object properties of the target data object:
determine that the object dependencies of the target data object did not change; and
not update the object dependencies of the data objects depending on the target data object.

5. The computing system of claim 1, wherein the one or more computer-readable storage media further store instructions that, when executed, cause the one or more hardware processors to:
evaluate properties of the target data object before updating the target data object according to the definition statement;
evaluate properties of the target data object after updating the target data object according to the definition statement; and
determine whether the one or more object properties of the target data object changed by comparing the properties of the target data object before updating the target data object with the properties of the target data object after updating the target data object.

6. The computing system of claim 1, wherein the one or more object properties comprise one or more object properties defining a logical structure of the target data object.

7. The computing system of claim 1, wherein, to determine that the definition statement changes the one or more object properties of the target data object, the one or more computer-readable storage media further store instructions that, when executed, cause the one or more hardware processors to:
determine that the definition statement removes an attribute of the target data object; and
identify a dependent object that depends on the attribute of the target data object.

8. A method, implemented in a computing system comprising at least one memory and at least one hardware processor coupled to the at least one memory, the method comprising:
updating a target data object of a database system according to a definition statement;
revalidating one or more data objects depending on the target data object responsive to determining that the definition statement changed object properties of the target data object;
otherwise, updating object dependencies of the one or more data objects depending on the target data object without revalidating the one or more data objects responsive to determining that the definition statement did not change the object properties of the target data object; and
executing a query using one or more data objects of the target data object or the data objects depending on the target data object after revalidation of the one or more data objects depending on the target data object or updating of object dependencies of the one or more data objects depending on the target data object.

9. The method of claim 8, further comprising:
comparing a logical structure of the target data object before and after updating the target data object;
determining that the definition statement changed the object properties of the target data object if the logical structure changed after updating the target data object; or determining that the definition statement did not change the object properties of the target data object if the logical structure did not change after updating the target data object.

10. The method of claim 8, further comprising:
receiving the definition statement; and
automatically updating the target data object according to the definition statement responsive to receiving the definition statement.

11. The method of claim 8, further comprising:
determining a base data object for a given data object of the one or more data objects depending on the target data object; and
updating object dependency metadata for the given data object of the one or more data objects depending on the target data object according to the determined base data object.

12. The method of claim 8, further comprising:
prior to updating the target data object according to the definition statement, determining that the definition statement will change object properties of the target data object;
determining that a data object depends on the object properties of the target data object; and
outputting a message indicating that the definition statement may invalidate at least one dependent object.

13. The method of claim 8, wherein revalidating the one or more data objects comprises testing validity of one or more parent objects of the one or more data objects.

14. One or more non-transitory computer-readable storage media comprising computer-executable instructions that, when executed by a computing system comprising at least one hardware processor and at least one memory coupled to the at least one hardware processor, cause the computing system to:
evaluate properties of a data object in a database;
receive a definition command to update the data object;
update the data object according to the definition command;
evaluate updated properties of the updated data object;
determine whether object properties of the data object changed based on the properties of the data object and the updated properties of the updated data object;
perform operations to:
(1) revalidate, responsive to determining that the object properties of the data object changed, one or more data objects depending on the data object; and otherwise
(2) update, responsive to determining that the object properties of the data object did not change, object dependencies of the one or more data objects depending on the data object without revalidating the data objects depending on the data object; and
execute a query using one or more data objects of the target data object or the data objects depending on the data object after revalidation of the one or more data objects depending on the data object or updating of object dependencies of the one or more data objects depending on the data object.

15. The one or more non-transitory computer-readable storage media of claim 14, wherein the computer-executable instructions when executed further cause the computing system to:
update the object dependencies of the one or more data objects according to a topologically sorted list of the one or more data objects.

16. The one or more non-transitory computer-readable storage media of claim 14, wherein, to determine whether the object properties of the data object changed, the computer-executable instructions when executed further cause the computing system to:
compare a logical structure of the data object before and after updating the data object;
determine that the object properties of the data object changed if the logical structure changed after updating the data object; and
determine that the object properties of the data object did not change if the logical structure did not change after updating the data object.

17. The one or more non-transitory computer-readable storage media of claim 14, wherein the definition command comprises a Data Definition Language statement.

18. The one or more non-transitory computer-readable storage media of claim 17, wherein the Data Definition Language statement comprises one or more of a CREATE statement, an ALTER statement, and a REPLACE statement indicating the data object.

19. The one or more non-transitory computer-readable storage media of claim 14, wherein the data object comprises a table or a view.

20. The one or more non-transitory computer-readable storage media of claim 14, wherein the computer-executable instructions when executed further cause the computing system to, in response to determining that the definition command does not change the one or more object properties of the data object:
determine that the object dependencies of the data object did not change; and
not update the object dependencies of the data objects depending on the data object.

\* \* \* \* \*